United States Patent
Henderson et al.

(10) Patent No.: US 12,128,812 B2
(45) Date of Patent: Oct. 29, 2024

(54) ADJUSTABLE SHORING BEAM AND HOOK ASSEMBLY

(71) Applicant: INNOVATIVE LOGISTICS, LLC, Fort Smith, AR (US)

(72) Inventors: Dylan Henderson, Fort Smith, AR (US); David Albers, Fort Smith, AR (US); Mark Belin, Fort Smith, AR (US)

(73) Assignee: INNOVATIVE LOGISTICS, LLC, Fort Smith, AR (US)

( * ) Notice: Subject to any disclaimer, the term of this patent is extended or adjusted under 35 U.S.C. 154(b) by 0 days.

(21) Appl. No.: 17/903,500

(22) Filed: Sep. 6, 2022

(65) Prior Publication Data
US 2023/0001844 A1 Jan. 5, 2023

Related U.S. Application Data

(63) Continuation of application No. 16/942,153, filed on Jul. 29, 2020, now Pat. No. 11,433,801.
(Continued)

(51) Int. Cl.
*B60P 7/08* (2006.01)
*B60P 7/15* (2006.01)
(Continued)

(52) U.S. Cl.
CPC ............... *B60P 7/15* (2013.01); *B60P 7/0815* (2013.01); *F16B 7/0486* (2013.01);
(Continued)

(58) Field of Classification Search
CPC ......... B60P 7/15; B60P 7/0815; B60P 7/0892; B60P 7/135; B60P 7/14; E04G 25/061; F16B 7/0426; A47H 1/022
(Continued)

(56) References Cited

U.S. PATENT DOCUMENTS 1,238,874 A * 9/1917 Biela .................. B60P 7/15
410/143
2,506,640 A 5/1950 Hawes
(Continued)

FOREIGN PATENT DOCUMENTS

CA 2144886 A1 9/1996
CA 3059030 A1 10/2018
(Continued)

OTHER PUBLICATIONS

International Search Report and Written Opinion dated Oct. 30, 2020, from PCT/US2020/043998, 13 sheets.
(Continued)

*Primary Examiner* — Stephen T Gordon
(74) *Attorney, Agent, or Firm* — KATTEN MUCHIN ROSENMAN LLP

(57) ABSTRACT

Disclosed herein is an adjustable shoring beam having a hook assembly configured to mate with E-track mating features. The adjustable shoring beam can be adjusted over a predetermined length range by adjusting the tube assembly and the rod assembly. In some embodiments, the extension length is fixed using a fixing clamp coupled to the tube assembly and the rod assembly. A connecting clamp and bracket may be used to couple a first adjustable shoring beam to a second adjustable shoring beam.

14 Claims, 41 Drawing Sheets

Related U.S. Application Data

(60) Provisional application No. 62/879,793, filed on Jul. 29, 2019.

(51) Int. Cl.
  *F16B 7/04* (2006.01)
  *E04G 25/06* (2006.01)
  *F16B 7/14* (2006.01)

(52) U.S. Cl.
  CPC .......... *E04G 25/061* (2013.01); *F16B 7/0426* (2013.01); *F16B 7/1418* (2013.01); *Y10T 403/30* (2015.01)

(58) Field of Classification Search
  USPC ......... 410/121, 129–132, 138–139, 141–151
  See application file for complete search history.

(56) References Cited

U.S. PATENT DOCUMENTS

| | | | |
|---|---|---|---|
| 2,678,139 | A | 5/1954 | Gildersleeve |
| 2,942,560 | A * | 6/1960 | Shultz .................... B61D 45/00 410/144 |
| 2,983,231 | A | 5/1961 | Henrikson |
| 3,078,813 | A | 2/1963 | Rolfe, Jr. |
| 3,249,370 | A | 5/1966 | Brogden |
| 3,459,326 | A | 8/1969 | Betjemann |
| 3,561,608 | A | 2/1971 | Weider |
| 3,667,635 | A | 6/1972 | Hackney |
| 3,695,456 | A | 10/1972 | Lewis |
| 3,774,939 | A | 11/1973 | Freads et al. |
| 3,861,816 | A | 1/1975 | Zaidan |
| 3,938,678 | A | 2/1976 | Kern |
| 4,231,695 | A | 11/1980 | Weston, Sr. |
| 4,502,619 | A | 3/1985 | Cox |
| 4,632,221 | A | 12/1986 | Stanford |
| 4,639,979 | A | 2/1987 | Polson |
| 4,650,383 | A * | 3/1987 | Hoff .......................... B60P 7/15 410/149 |
| 4,737,056 | A | 4/1988 | Hunt |
| 4,967,878 | A | 11/1990 | Adams |
| 4,982,922 | A * | 1/1991 | Krause ..................... B60P 7/15 248/222.12 |
| 5,011,358 | A | 4/1991 | Anderson et al. |
| 5,040,916 | A | 8/1991 | Morgan |
| 5,192,187 | A | 3/1993 | Sweet |
| 5,259,690 | A | 11/1993 | Legge |
| 5,344,266 | A | 9/1994 | Kolb |
| 5,378,093 | A | 1/1995 | Schroeder |
| 5,411,113 | A | 5/1995 | Lubinski |
| 5,454,672 | A | 10/1995 | Halpin et al. |
| 5,507,237 | A | 4/1996 | Barrow et al. |
| 5,516,245 | A | 5/1996 | Cassidy |
| 5,560,730 | A | 10/1996 | Gillard |
| 5,785,475 | A | 7/1998 | Winstel et al. |
| 5,799,585 | A | 9/1998 | Brennan, Jr. et al. |
| 5,941,667 | A * | 8/1999 | Hardison .................. B60P 7/15 410/148 |
| 5,957,780 | A | 9/1999 | Grazioli |
| 5,971,685 | A | 10/1999 | Owens |
| 6,062,780 | A * | 5/2000 | Petelka ..................... B60P 7/15 410/150 |
| 6,106,186 | A | 8/2000 | Taipale et al. |
| 6,238,154 | B1 | 5/2001 | DaPrato |
| 6,529,797 | B2 | 3/2003 | Williams et al. |
| 6,575,686 | B2 | 6/2003 | Hagenzieker |
| 6,669,089 | B2 | 12/2003 | Cybulski et al. |
| 6,698,655 | B2 | 3/2004 | Kondo et al. |
| 6,932,195 | B1 | 8/2005 | Hayman |
| 7,030,760 | B1 | 4/2006 | Brown |
| 7,101,139 | B1 | 9/2006 | Benedict |
| 7,275,731 | B1 | 10/2007 | Shinault |
| 7,327,262 | B2 | 2/2008 | Motteram et al. |
| 7,513,856 | B2 | 4/2009 | Jones |
| 7,578,644 | B2 * | 8/2009 | Squyres ............... B61D 45/007 410/144 |
| 7,603,299 | B1 | 10/2009 | Dewey, Jr. et al. |
| 7,739,147 | B2 | 6/2010 | Branigan et al. |
| 7,742,745 | B2 | 6/2010 | Twitchell, Jr. |
| 7,826,920 | B2 | 11/2010 | Stevens et al. |
| 7,918,631 | B2 | 4/2011 | Overbye |
| 7,959,059 | B2 | 6/2011 | Tamamori et al. |
| 7,991,505 | B2 | 8/2011 | Lert, Jr. et al. |
| 8,104,579 | B1 | 1/2012 | Fu |
| 8,442,879 | B2 | 5/2013 | Dewey, Jr. et al. |
| 8,448,995 | B2 | 5/2013 | Ward |
| 8,491,240 | B2 | 7/2013 | Baker |
| 8,626,540 | B2 | 1/2014 | Peterkofsky et al. |
| 8,731,708 | B2 | 5/2014 | Shakes et al. |
| 8,744,884 | B2 | 6/2014 | Benda et al. |
| 8,972,045 | B1 | 3/2015 | Mountz et al. |
| 9,157,245 | B2 | 10/2015 | Thacker |
| 9,367,827 | B1 | 6/2016 | Lively et al. |
| 9,439,526 | B2 | 9/2016 | Woodruff et al. |
| 9,631,656 | B2 | 4/2017 | Sato |
| 9,808,893 | B2 | 11/2017 | McClure |
| 9,915,385 | B2 | 3/2018 | Eaton |
| 10,279,955 | B2 | 5/2019 | Bradley et al. |
| 10,830,263 | B2 | 11/2020 | Logan |
| 11,433,801 | B2 * | 9/2022 | Henderson ................. B60P 7/15 |
| 2003/0161700 | A1 | 8/2003 | Moore |
| 2004/0258472 | A1 | 12/2004 | Petratto |
| 2005/0071234 | A1 | 3/2005 | Schon |
| 2006/0015532 | A1 | 1/2006 | Mizell |
| 2007/0136079 | A1 | 6/2007 | Beykirch et al. |
| 2007/0156491 | A1 | 7/2007 | Schuler et al. |
| 2007/0174148 | A1 | 7/2007 | Schuler et al. |
| 2007/0279224 | A1 | 12/2007 | Branigan |
| 2008/0014015 | A1 | 1/2008 | Brick |
| 2008/0103944 | A1 | 5/2008 | Hagemann et al. |
| 2008/0167817 | A1 | 7/2008 | Hessler et al. |
| 2008/0217276 | A1 | 9/2008 | Brady et al. |
| 2008/0226389 | A1 | 9/2008 | James |
| 2008/0287271 | A1 | 11/2008 | Jones |
| 2009/0261585 | A1 | 10/2009 | Ward |
| 2009/0267770 | A1 | 10/2009 | Twitchell, Jr. |
| 2010/0108760 | A1 | 5/2010 | Eccleston |
| 2010/0219660 | A1 * | 9/2010 | Rasmussen ............ F16M 13/02 296/156 |
| 2011/0138584 | A1 | 6/2011 | Wild |
| 2011/0142564 | A1 * | 6/2011 | Kaburick .................. B60P 7/15 410/150 |
| 2011/0262215 | A1 | 10/2011 | Thacker |
| 2011/0274523 | A1 | 11/2011 | Petalas |
| 2012/0042495 | A1 | 2/2012 | Bacon |
| 2012/0087719 | A1 | 4/2012 | Rixen et al. |
| 2012/0101956 | A1 | 4/2012 | Hyre et al. |
| 2012/0112904 | A1 | 5/2012 | Nagy |
| 2012/0191272 | A1 | 7/2012 | Andersen et al. |
| 2014/0277691 | A1 | 9/2014 | Jacobus et al. |
| 2015/0108288 | A1 | 4/2015 | Lee |
| 2015/0174706 | A1 | 6/2015 | McClure |
| 2018/0272917 | A1 | 9/2018 | Embleton et al. |
| 2019/0137008 | A1 | 5/2019 | Peterson et al. |
| 2019/0145115 | A1 | 5/2019 | Bacon et al. |

FOREIGN PATENT DOCUMENTS

| | | |
|---|---|---|
| CN | 203520452 U | 4/2014 |
| CN | 208534931 U | 2/2019 |
| DE | 2951271 A1 | 7/1981 |
| DE | 10257515 A1 | 7/2004 |
| EP | 2735498 A1 | 5/2014 |
| EP | 2845823 A1 | 3/2015 |
| GB | 2344077 A | 5/2000 |
| JP | 07-069458 A | 3/1995 |
| JP | 11-336317 A | 12/1999 |
| JP | 2002-154372 A | 5/2002 |
| KR | 20-0384668 Y1 | 5/2005 |
| KR | 20110087608 A | 8/2011 |
| KR | 10-2014-0101117 A | 8/2014 |

(56) References Cited

FOREIGN PATENT DOCUMENTS

| WO | 2010-139545 A1 | 12/2010 |
| WO | 2016/170555 A1 | 10/2016 |

OTHER PUBLICATIONS

International Search Report and Written Opinion dated Nov. 3, 2020, from PCT/US2020/044022, 9 sheets.
International Search Report and Written Opinion dated Nov. 5, 2020, from PCT/US2020/044008, 10 sheets.
International Preliminary Report on Patentability dated Feb. 10, 2022, from PCT/US2020/043998, 10 sheets.
Notice of Allowance dated May 6, 2022, from U.S. Appl. No. 16/942,153, 44 sheets.
Office Action dated Jun. 17, 2021, from U.S. Appl. No. 16/405,177, 38 sheets.
Notice of Allowance dated Dec. 31, 2018, from U.S. Appl. No. 15/798,597, 14 sheets.
Notice of Allowance dated Mar. 7, 2019, from U.S. Appl. No. 15/798,597, 7 sheets.
Non-final Office Action dated Oct. 3, 2018, from U.S. Appl. No. 15/798,597, 24 sheets.
Office Action dated Jan. 19, 2018, from U.S. Appl. No. 15/798,597, 10 sheets.
Transmittal; International Search Report; Written Opinion of the International Searching Authority for International Application No. PCT/US2017/059113 with a mailing date of Jun. 4, 2018, 12 sheets.
H&M Bay Deploys RFID solution at cross-docketing distribution center, RFID24-7Com, Mar. 30, 2010, 2 sheets.
BPL Adds Customer Value with RFID, Sato Eueope, Megatrux, Inc., Rancho Cucamonga, California, 3 sheets.
"Maida Napolitano", Contributing editor, Crossdocking: The latest and greatest, Article from Logistics Management, MMH Editorial, Apr. 1, 2010, 4 sheets.
K. Choy, et al., Cross-dock job assignment problem in space-constrained industrial logistics distribution hubs with a single docking zone, Taylor & Francis Online, International Journal of Production Research, vol. 50, Issue 9, 2012, Special Issue: International logistics systems: theory and applications, 2 sheets.
G. Miragliotta, et al., A quantitative model for the introduction of RFId in the fast moving consumer goods supply chain: Are there any profits?, International Journal of Operations & Production Management, ISSN: 0144-3577, Online from 1980, Subject Area: Management Science & Operations, 2 sheets.
J Wang, et al., Real-time trailer scheduling for crossdock operations, Transportation Journal 47.2, (Apr. 2008-Jun. 2008): 5(16), 16 sheets.
Transmittal; International Search Report; and the Written Opinion of the International Search Authority for International Application No. PCT/US2015/065775 with a mailing date of Mar. 30, 2016, 10 sheets.
Non-Final Office Action dated Feb. 16, 2023, from U.S. Appl. No. 16/941,975, 49 sheets.
Office Action dated Feb. 23, 2023, from Canadian Patent Application No. 3,145,438, 5 sheets.
The Extended European Search Report dated Jul. 31, 2023, from European Patent Application No. 20848439.4, 10 sheets.
The Extended European Search Report dated Aug. 1, 2023, from European Patent Application No. 20846060.0, 8 sheets.
The Extended European Search Report dated Jul. 31, 2023, from European Patent Application No. 20846879.3, 7 sheets.
Office Action dated Aug. 23, 2023, from Canadian Application No. 3,154,816, 4 sheets.
Final Office Action dated Sep. 14, 2023, from U.S. Appl. No. 16/941,975, 39 sheets.
Final Office Action dated Nov. 15, 2023, from U.S. Appl. No. 16/941,936, 59 sheets.
Office Action dated May 17, 2023, from U.S. Appl. No. 16/941,936, 63 sheets.
Advisory Action dated Feb. 22, 2024, from U.S. Appl. No. 16/941,975, 10 sheets.
Non-Final Office Action dated Mar. 25, 2024, from U.S. Appl. No. 16/941,975, 71 sheets.
Official Action dated Mar. 26, 2024, from Canadian Patent Application No. 3145438, 4 sheets.
Notice of Allowance dated May 10, 2024, from corresponding Mexican Patent Application No. MX/a/2023/006946, 3 sheets.
Office Action dated May 28, 2024, from corresponding Canadian Patent Application No. 3,145,424, 10 sheets.
1 Applicant-Initiated Interview Summary dated Jul. 17, 2024, from U.S. Appl. No. 16/941,975, 4 sheets.
Notice of Allowance dated Aug. 28, 2024, from U.S. Appl. No. 16/941,975, 23 sheets.

* cited by examiner

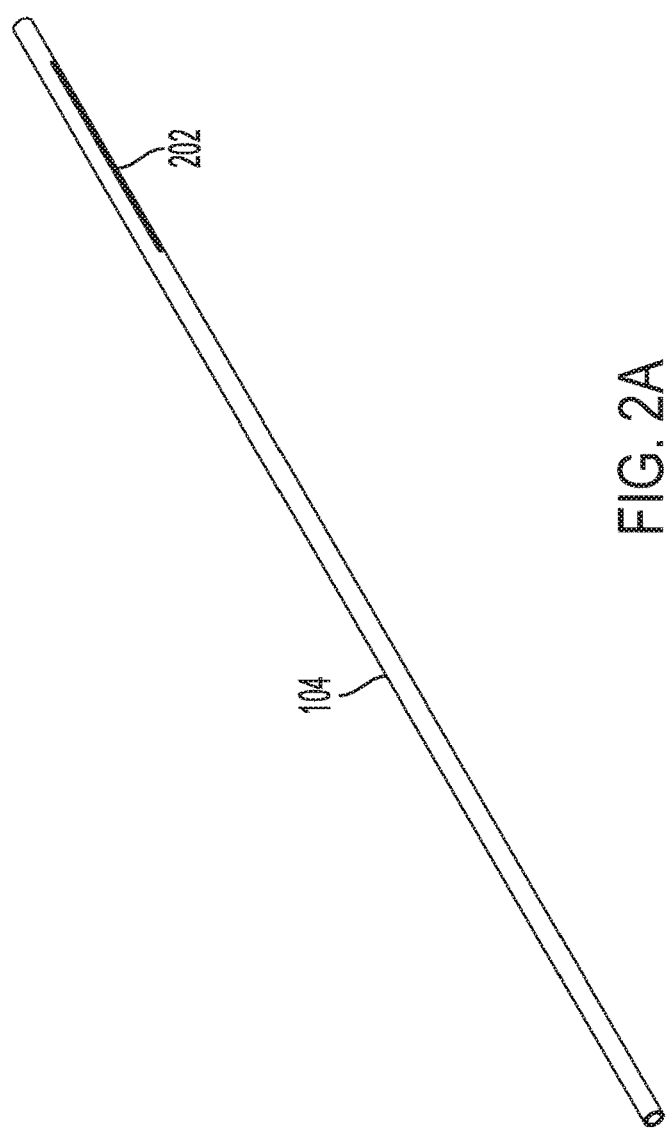
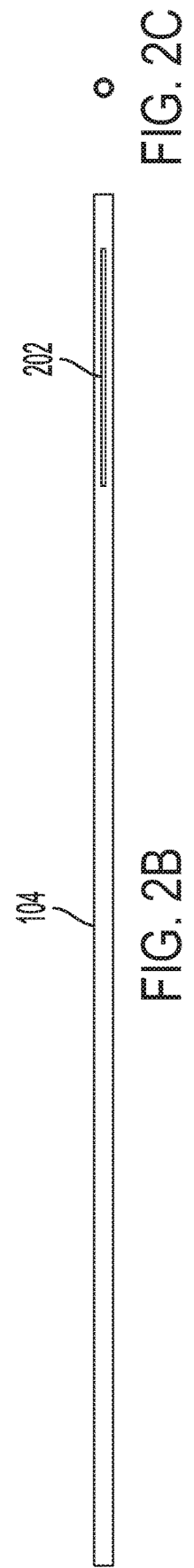
FIG. 2A
FIG. 2B
FIG. 2C

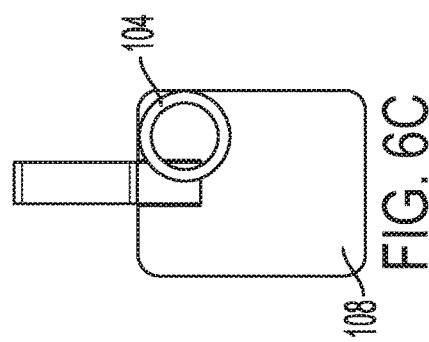
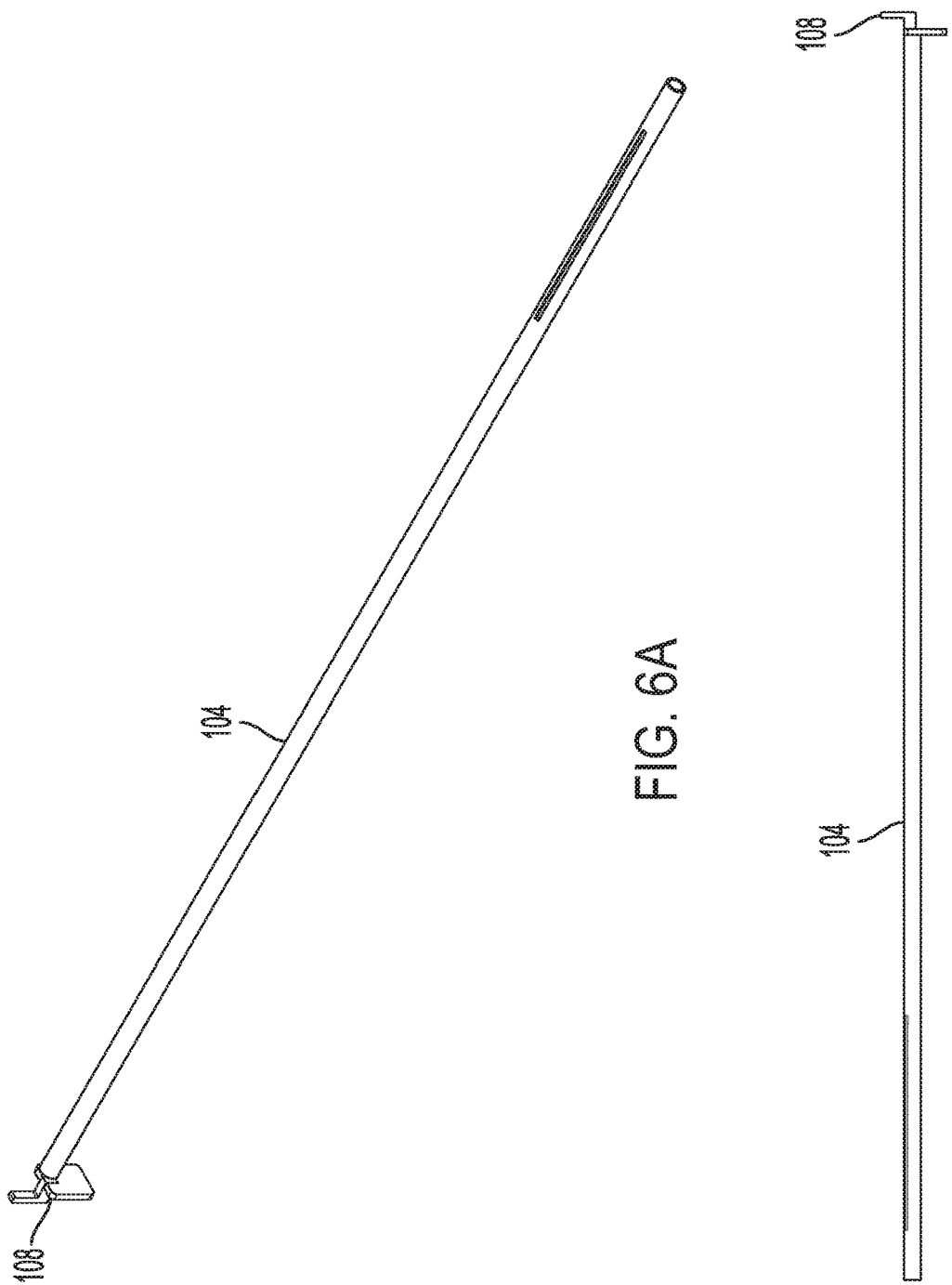

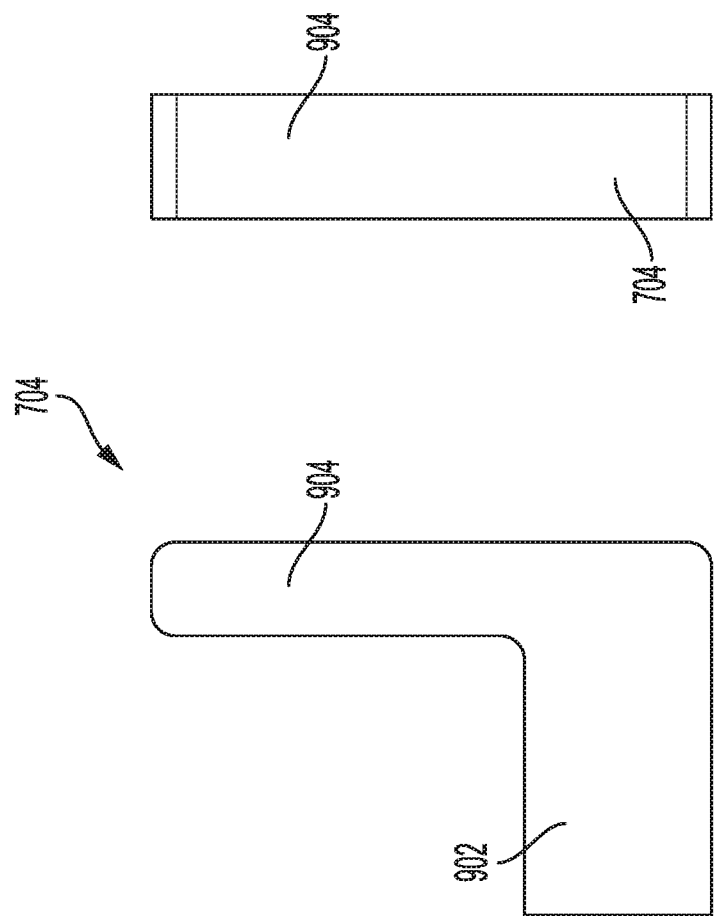

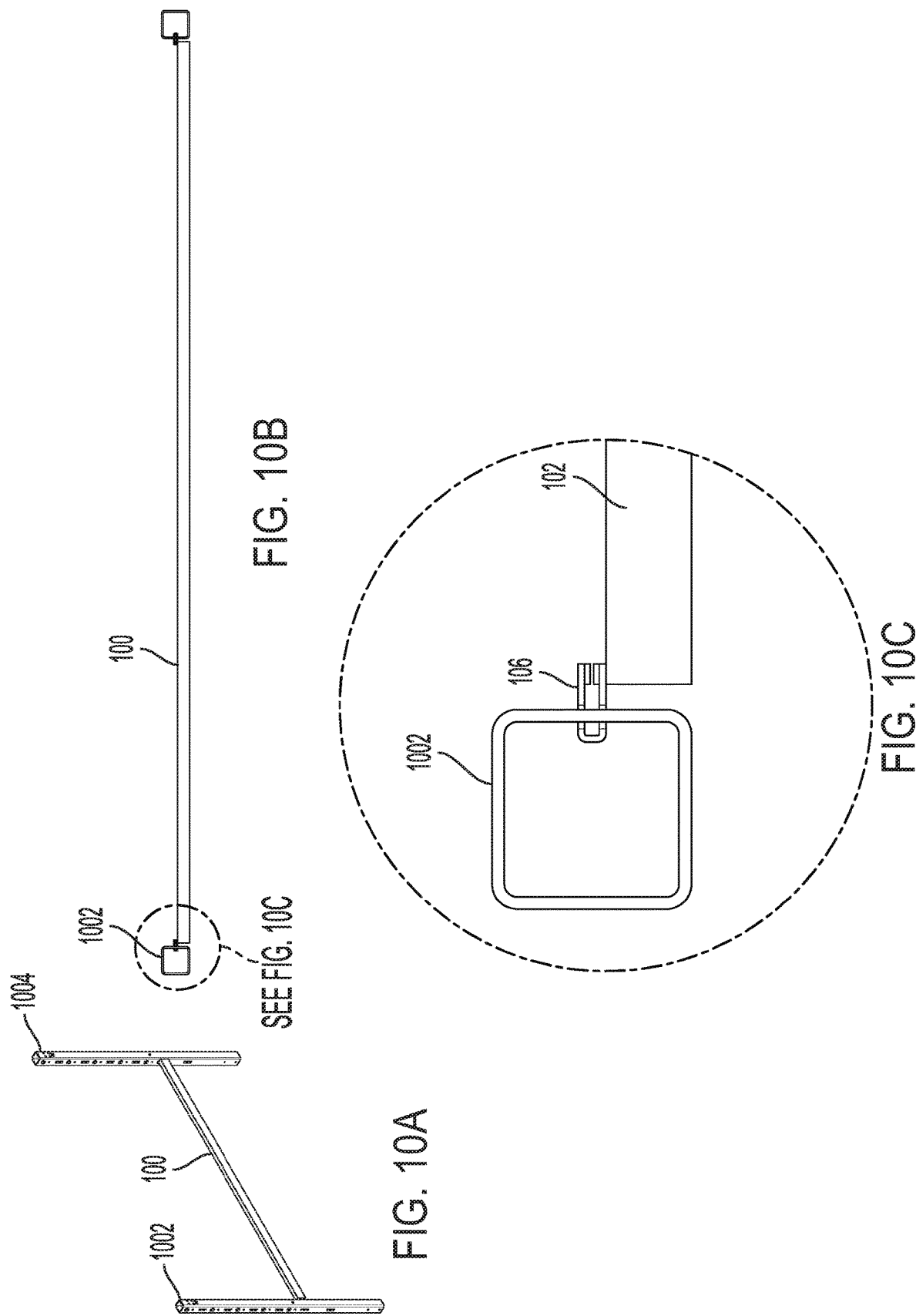

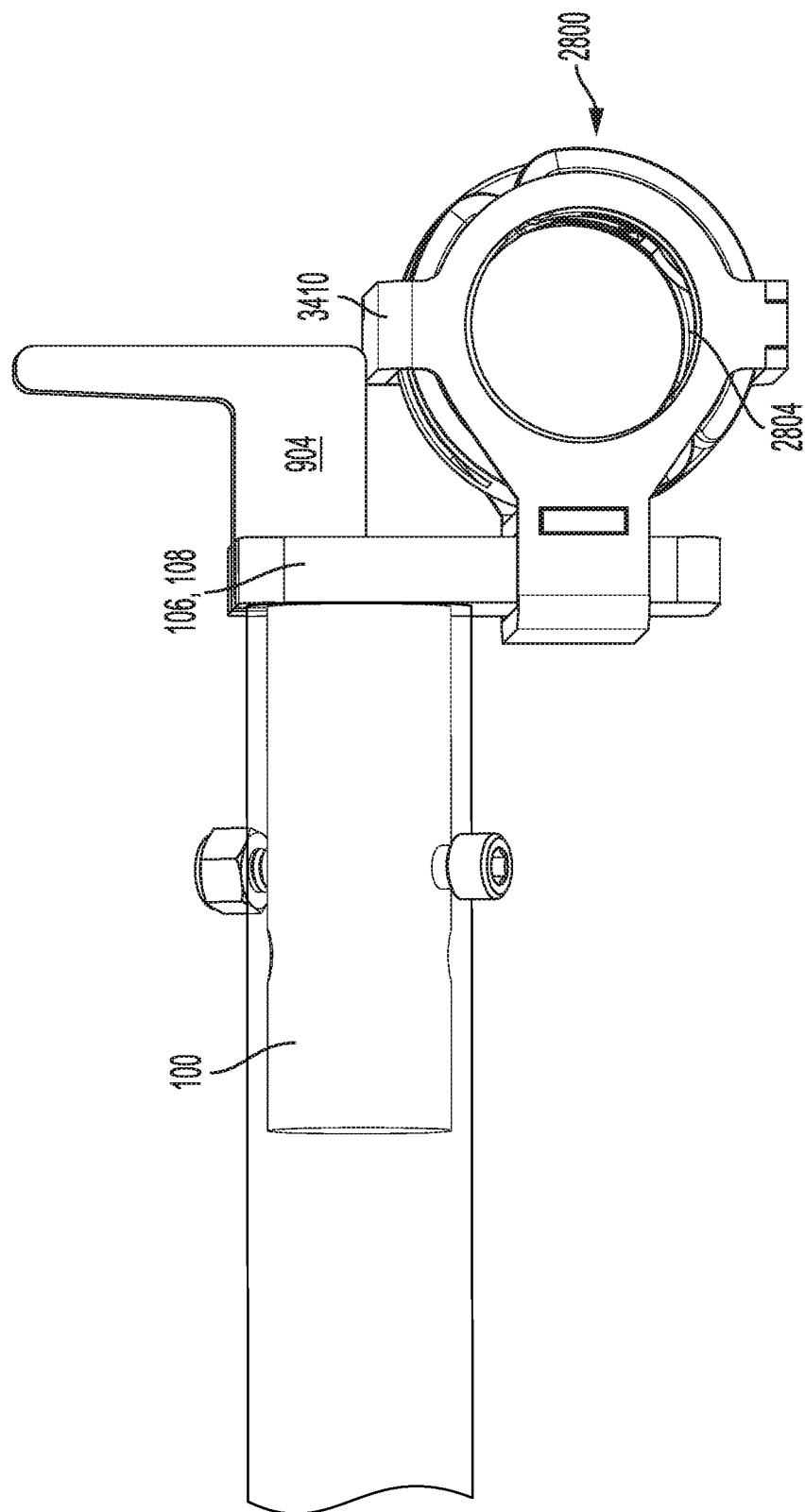

ADJUSTABLE SHORING BEAM AND HOOK ASSEMBLY

CROSS-REFERENCE TO RELATED APPLICATIONS

This application is a continuation of U.S. patent application Ser. No. 16/942,153, filed Jul. 29, 2020, now U.S. Pat. No. 11,433,801, which claims priority to U.S. Provisional Application Ser. No. 62/879,793, filed Jul. 29, 2019, the entire contents of which are hereby incorporated by reference in their entirety.

FIELD OF THE INVENTION

The present invention is directed to an adjustable shoring beam that prevents the movement of freight. This invention is intended to be used with E-track mating features such as those found on the vertical posts and decks of a movable platform described in U.S. Pat. No. 10,279,955, issued May 7, 2019, the entire contents of which are hereby incorporated in their entirety. The adjustable shoring beam may engage surfaces containing E-track mating features which are parallel and/or perpendicular to the length of the beam.

BACKGROUND

Adjustable shoring beams are used in securing freight in trailers or on loading platforms. Current adjustable shoring beams typically rely on a rudimentary locking system, if any, to maintain the adjustable shoring beam at a fixed length. These shoring beams can be difficult to adjust. Further, the use of the adjustable shoring beams is limited to horizontal use between mating features due to their design. Therefore, there exists a need for an adjustable shoring beam that can easily be adjusted and secured in a variety of configurations.

SUMMARY

Disclosed herein is an adjustable shoring beam configured to mate with E-track mating features. The adjustable shoring beam can be adjusted over a predetermined length range by adjusting the tube assembly and the rod assembly. In some embodiments, the extension length is fixed using a fixing clamp coupled to the tube assembly and the rod assembly. A connecting clamp and bracket may be used to couple a first adjustable shoring beam to a second adjustable shoring beam.

BRIEF DESCRIPTION OF THE DRAWINGS

FIGS. 2A-2C depict various views of the tube assembly in isolation.

FIGS. 6A-6C depicts the coupling of the hook assembly to the tube assembly.

FIGS. 9A-9C depict various views of the securement hook in isolation.

FIGS. 10A-10C depict the adjustable shoring beam coupled to vertical posts of a movable platform.

FIGS. 37-39 depict the connection assembly used to couple a first adjustable shoring beam to a second adjustable shoring beam.

DETAILED DESCRIPTION

Figure 1:
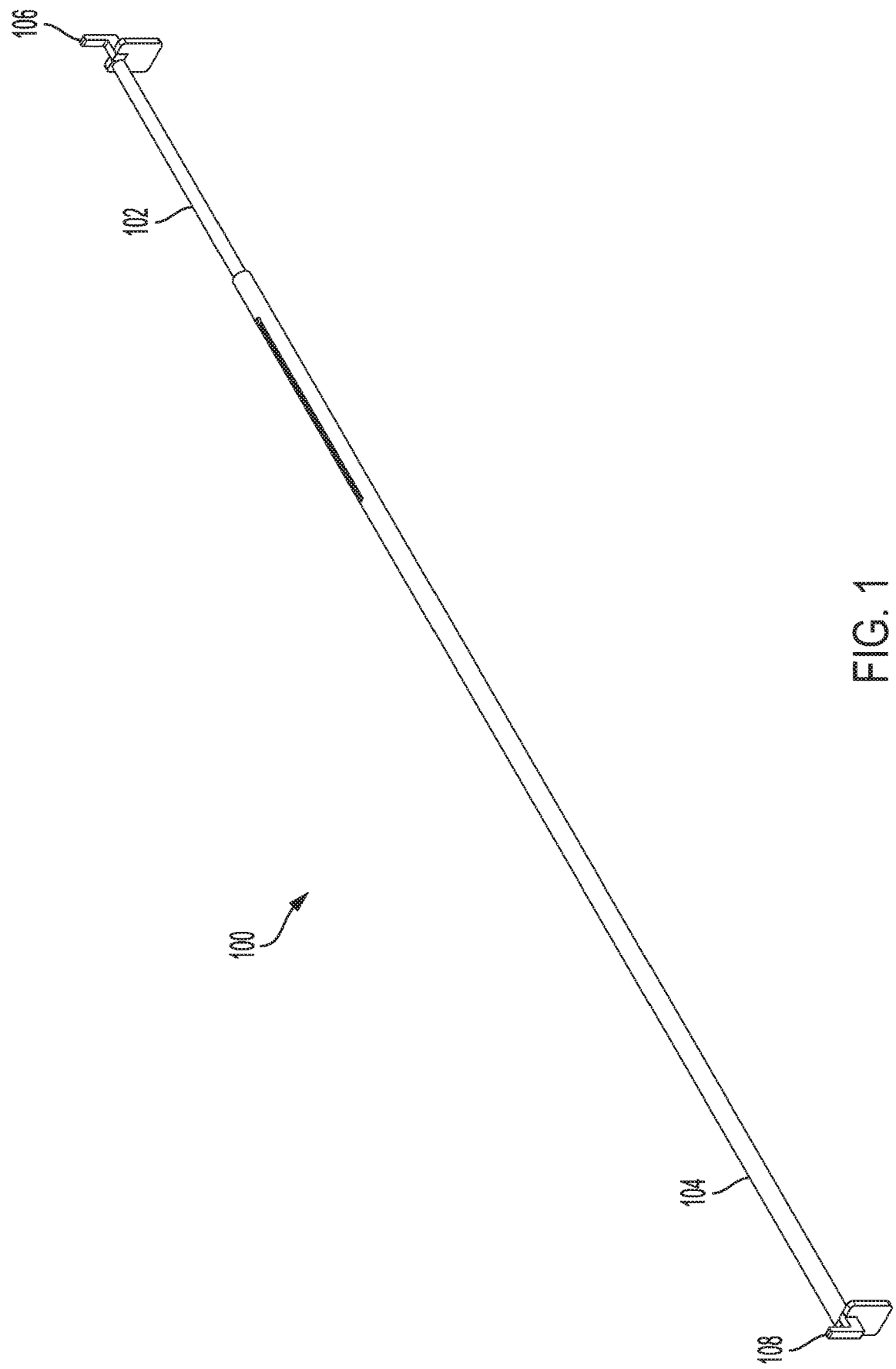
FIG. 1 depicts an isometric view of a first embodiment of the adjustable shoring beam.

Referring to FIG. 1, depicted is an adjustable shoring beam 100. Conventional shoring beams are common load-bearing freight securement devices that extend and retract with ends that lock into track systems, i.e. E-track and A-track. Adjustable shoring beam 100 is adjustable by sliding rod assembly 102 within tube assembly 104 to accommodate a range of usable lengths.

Rod assembly 102 and tube assembly 104 are depicted as having circular cross-section. However, it should be apparent that any cross-section can be utilized as long as rod assembly 102 can slide within tube assembly. Other possible compatible cross-section shapes include square, rectangular, oval, quadrilateral, round in square, oval in rectangle, etc.

Rod assembly 102 is coupled to a first hook assembly 106 and tube assembly 104 is coupled to a second hook assembly 108. First hook assembly 106 and second hook assembly 108 are used to secure adjustable shoring beam 100 to a movable platform. Rod assembly 102, first hook assembly 106, tube assembly 104, and second hook assembly 108 are all preferably formed from steel, such as ASTM A36 steel. However, it should be obvious that any industrial grade metal (or even strong plastic) can be used in their construction.

First hook assembly 106 is preferably coupled to rod assembly 102 through welding. Similarly, second hook assembly 108 is preferably coupled to tube assembly 104 through welding. However, any connection method may be used in place of welding.

FIGS. 2A-2C depict tube assembly 104 in isolation without first hook assembly 106. Tube assembly 104 comprises slot 202 which limits the expansion/contraction length of adjustable shoring beam 100 as will be described later.

In a preferred embodiment, tube assembly 104 has a total length of ~81", an inner circumference of ~0.8", and an outer circumference of ~1.09". Slot 202 preferably has a length of 14" and a width of ~0.25", with a first end of slot 202 starting ~3.25" from an end of tube assembly 104.

Figure 3A:
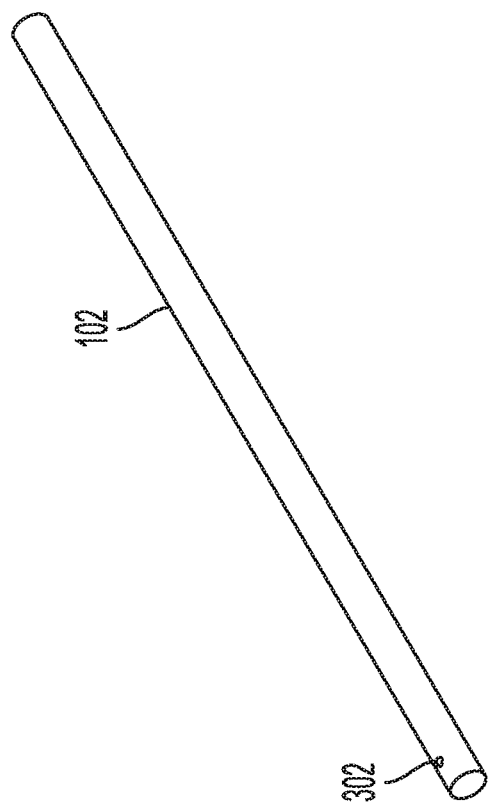
FIGS. 3A-3B depict various views of the rod assembly in isolation.
Figure 3B:
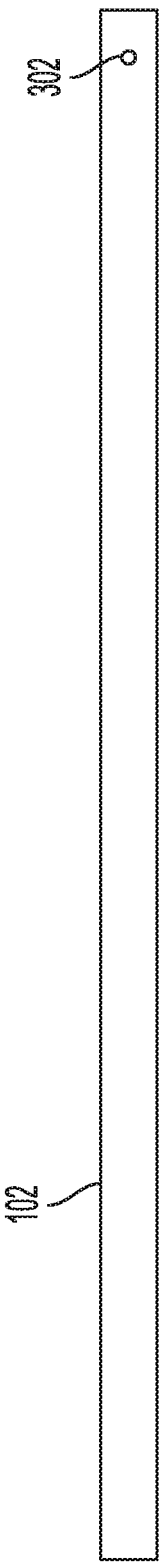

FIGS. 3A-3C depict rod assembly 102 in isolation. Rod assembly 102 preferably has a solid cross-section that is ~0.75" in diameter. In a preferred embodiment, rod assembly 102 has a total length of 20.5". Rod assembly 102 further comprises screw hole 302 which has a threaded interior (12-28 Unified National Fine Threads). A center of screw hole 302 is approximately 0.63" from an end of rod assembly 102.

Figure 4:
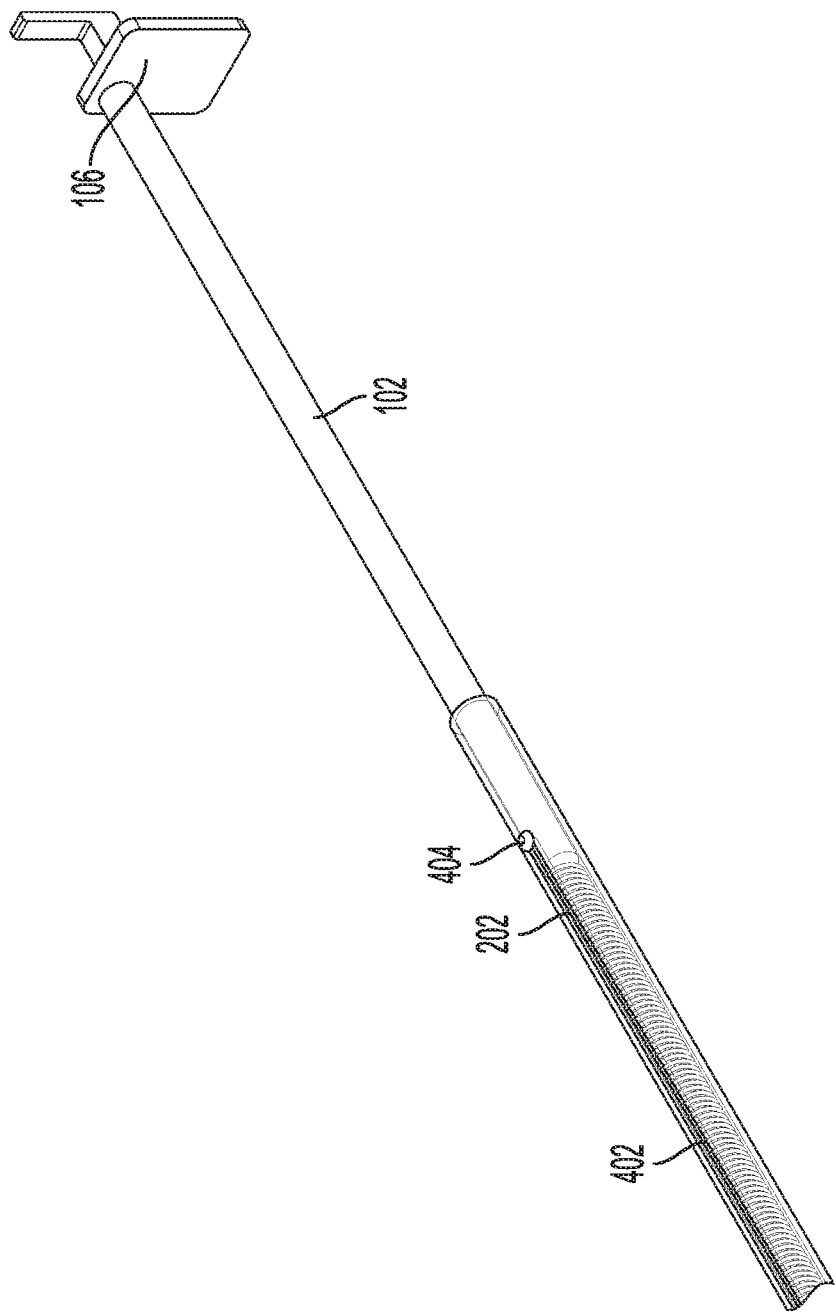
FIG. 4 depicts a partial cutaway of the tube assembly inserted into the rod assembly to show the positioning of a compression spring.

FIG. 4 depicts a partial cutaway of the tube assembly 102 inserted into rod assembly 104. A screw, 404 is placed through slot 202 and is threaded into screw hole 302 to prevent the separation of tube assembly 102 from rod assembly 104. The length of slot 202 also limits the expansion of contraction of adjustable shoring beam 100.

Compression spring 402, which is internal to tube assembly 102, is compressed by rod assembly 104 and provides force which maintains adjustable showing beam 100 in a fully expanded configuration unless a compression force is applied. In a preferred embodiment, one end of the spring is coupled to a stopper within tube assembly 102, preventing that end of the spring from moving and allowing a compression or stretching force to be applied to the spring.

Figure 5B:
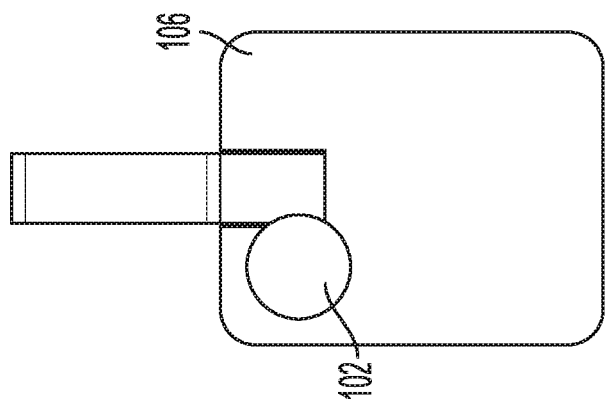
FIGS. 5A-5B depicts the coupling of the hook assembly to the rod assembly.
Figure 5A:
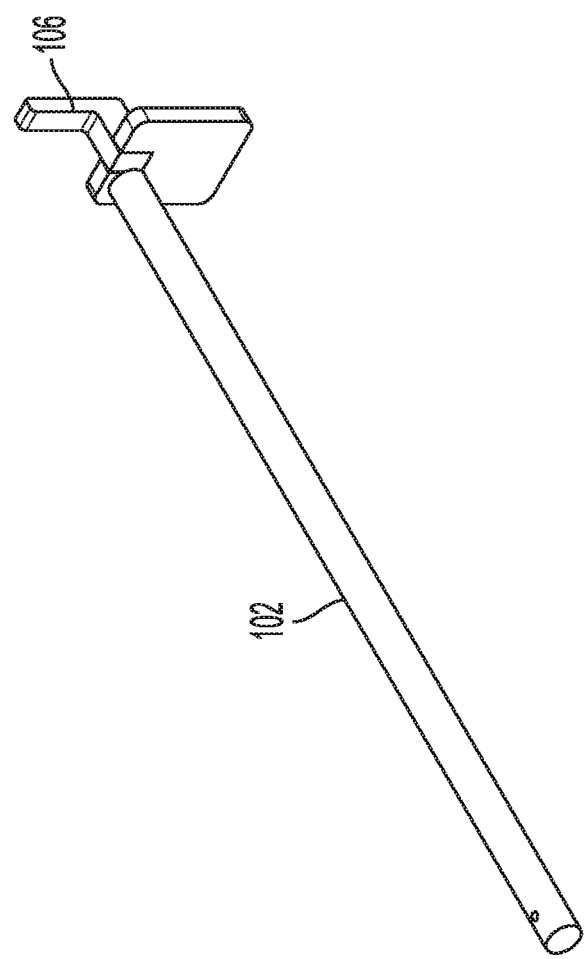

FIGS. 5A-5B depicts the coupling of the first hook assembly 106 to the rod assembly 102. As shown, the centerline of the first hook assembly 106 is offset from the centerline of the rod assembly 102. This offset allows freight to be loaded to the maximum extent on the movable platform and still be secured as will be shown later. Preferably, a center of rod assembly 102 is coupled to first hook assembly 106 a distance ~0.56" from a top and ~0.56" from a left side of first hook assembly 106 in order to provide the offset.

FIGS. 6A-6C depict the coupling of second hook assembly 108 to tube assembly 104. As shown, the centerline of the second hook assembly 108 is offset from the centerline of the tube assembly 104. Preferably, a center of tube assembly 104 is coupled to second hook assembly 108 a distance ~0.56" from a top and ~0.56" from a left side of second hook assembly 108 in order to provide the offset.

Figure 7C:
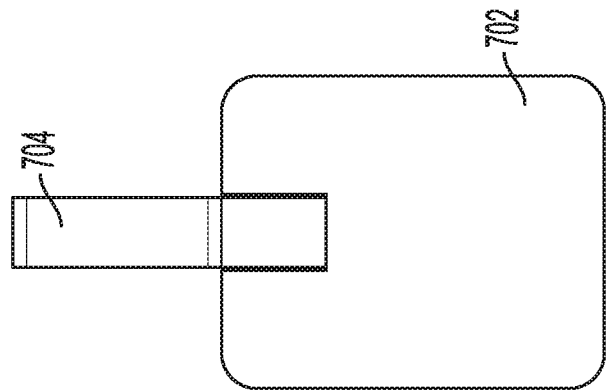
FIGS. 7A-7C depict various views of the hook assembly in isolation.
Figure 7B:
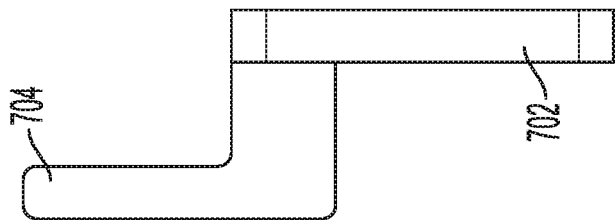
Figure 7A:
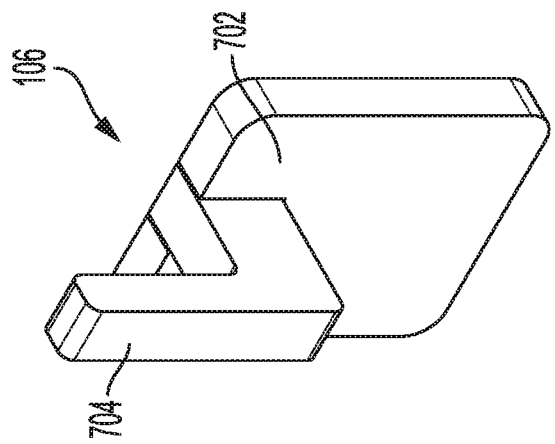

FIGS. 7A-7C depict various views of both first hook assembly 106 and second hook assembly 108 in isolation (preferably identical in construction). As shown, first hook assembly 106 comprises securement plate 702 which is coupled to securement hook 704. Securement plate 702 and securement hook 704 are preferably formed separately by molding and later joined together by welding. First hook assembly 106 and second hook assembly 108 are configured to mate with a mating feature known in the industry as an E-Track. In FIGS. 7A-7C, the drawings represent the plate 702 to be in the 6:00 position and the hook 704 in the 12:00 position. The plate 702 could also be in the 3:00 or 9:00 position relative to the hook 704 and retain the capacity to engage E-track on the posts or floor.

Figure 8C:
FIGS. 8A-8C depict various views of the securement plate in isolation.
Figure 8B:
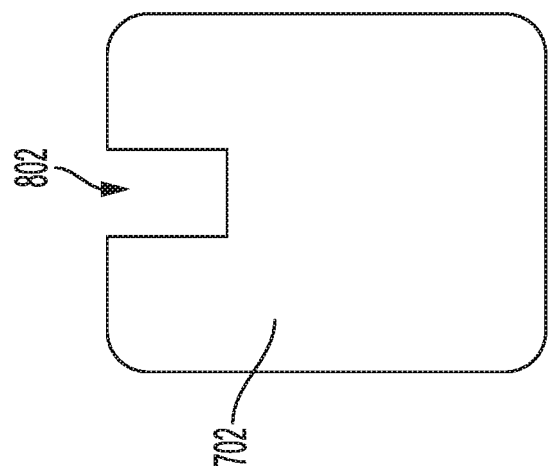
Figure 8A:
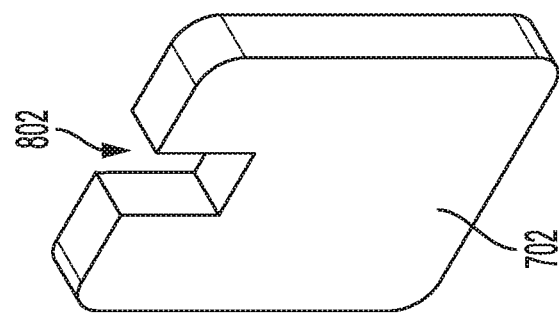

FIGS. 8A-8C depict various views of securement plate 702 in isolation. As shown, securement plate 702 is preferably rectangular in shape with a height of ~2.75" and a width of ~2.25". Each corner is preferably chamfered or curved with a radius of ~0.25". Securement plate 702 preferably has a thickness of ~0.38".

Securement plate 702 further comprises cutout 802 which is used when joining securement hook 704. Cutout 802 is preferably arranged along a top of securement plate 702 at the center. Cutout 802 is preferably ~0.55" in width and ~0.75" in height.

FIGS. 9A-9C depict various views of securement hook 704 in isolation. Securement hook 704 is generally L-shaped having securement section 902 and perpendicular hook section 904. Securement section 902 is preferably ~1.5" in width and ~0.75" in height. Hook section 904 is preferably ~0.375" in width and ~1.5" in height, making the overall dimensions of securement hook 704 ~1.5" in width and ~2.25" in height. Both securement section 902 and hook section 904 are preferably 0.5" in thickness. Securement section 902 is placed within cutout 802 and welded together to form first hook assembly 106 as depicted in FIGS. 7A-7C.

Shoring beams of a similar nature are commonly available within the industry to span trailer walls to secure freight. However, these existing beams only allow for securement between mating E-track features in two parallel planes which are perpendicular to the length of the beam. However, the shape of securement hook 704 allows adjustable shoring beam 100 to be used between mating E-Track features which are (a) perpendicular to a length of adjustable shoring beam 100 or (b) parallel to the length of the adjustable shoring beam 100, such as the floor of a movable platform.

FIGS. 10A-10C depict the use of adjustable shoring beam 100 to span vertical posts 1002 and 1004. As best shown in FIGS. 10B and 10C, the offset (e.g., between rod assembly 102 and first hook assembly 106) allows more cargo to be placed on the movable platform because of the additional room provided by adjustable shoring beam 100 (e.g., ~1.5") on each side of the movable platform while still providing the required shoring strength.

Figure 11:
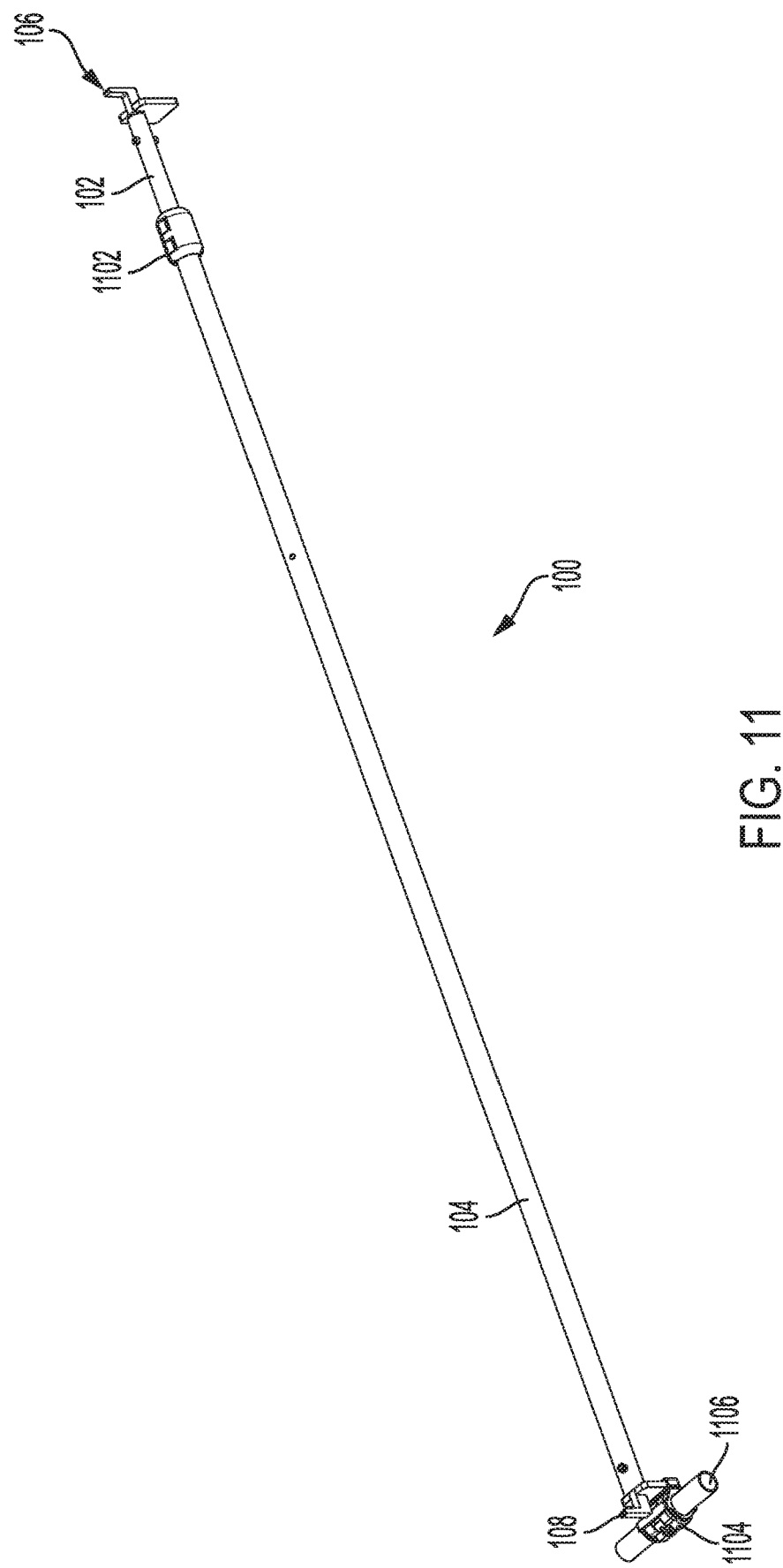
FIG. 11 depicts another embodiment of an adjustable shoring beam.

FIG. 11 depicts an alternate embodiment of adjustable shoring beam 100. In this embodiment, the length of adjustable shoring beam is fixed using fixing clamp 1102 which locks the positions of sliding rod assembly 102 and tube assembly 104 relative to each other. Further disclosed in this embodiment is mating clamp 1104 which allows a first adjustable shoring beam 100 to be coupled to a second adjustable shoring beam 1106 in a T-configuration as depicted.

This embodiment does not include slot 202, screw hole 302, or screw 404. Further, first hook assembly 106 is detachably coupled to sliding rod assembly 102 and second hook assembly 108 is detachable coupled to tube assembly 104 as will be described later.

Figure 12:
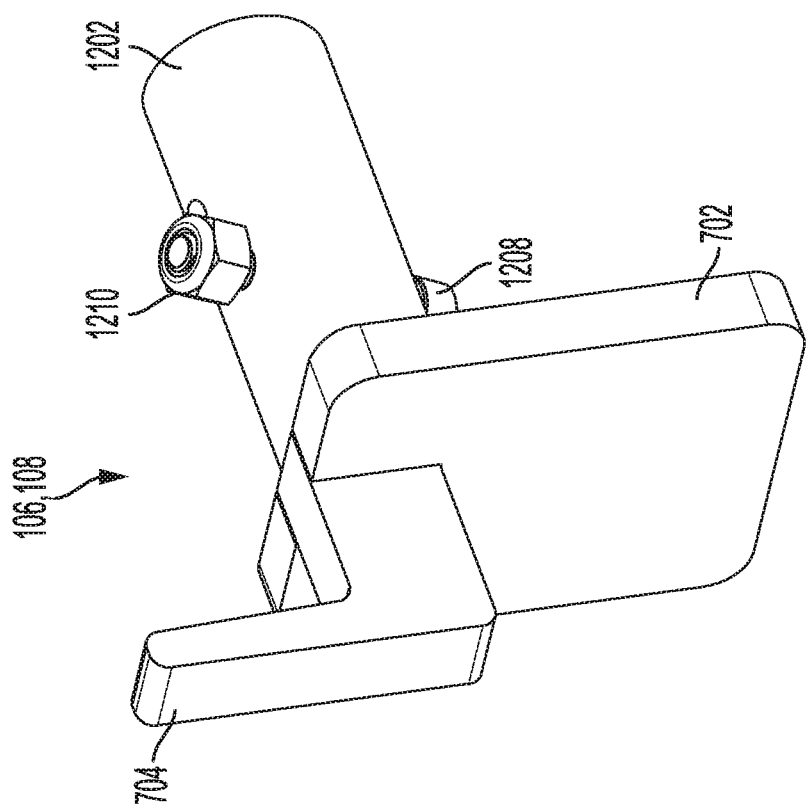
FIGS. 12 and 13 depict an alternate embodiment of the first hook assembly and the second hook assembly.
Figure 13:
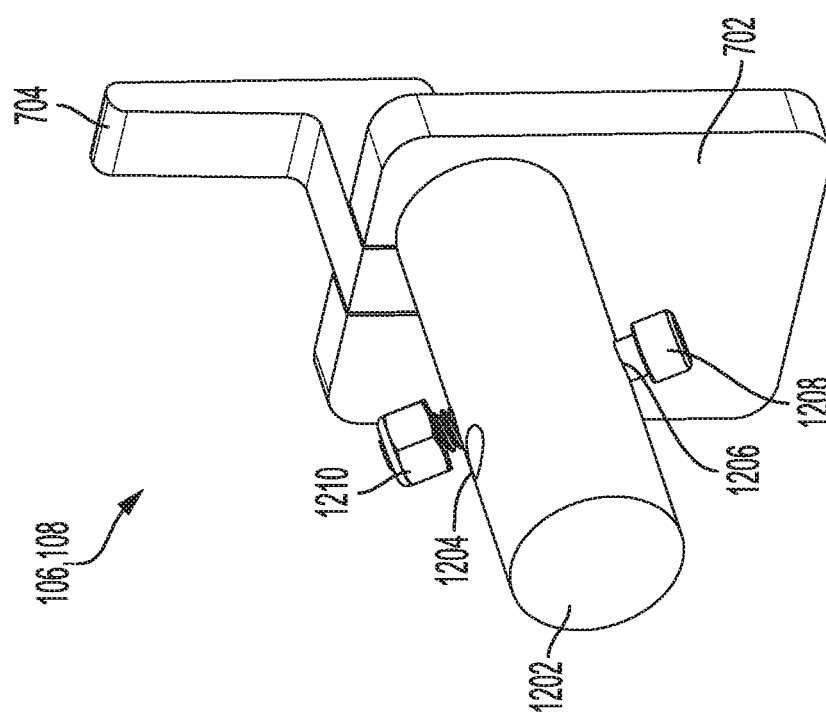

In the embodiment described in FIGS. 1-10C, the first hook assembly 106 is permanently attached to sliding rod assembly 102. In this embodiment, first hook assembly 106 and second hook assembly comprise peg 1202 which is secured to a rear of securement plate 702 via welding as depicted in FIGS. 12 and 13. Peg 1202 is preferably solid and formed from the same metal as the rest of adjustable shoring beam 100. Peg 1202 comprises bore 1204 and bore 1206 which are spaced apart from each other and arranged in an X-pattern. A bolt 1208 is placed through bore 1204 or 1206 and then a nut is placed on the opposing end to secure first hook assembly 106 to sliding rod assembly 102. By having two bores 1204, and 1206, the first hook assembly 106 can be secure in a first position or a second position perpendicular to the first position.

Figure 14:
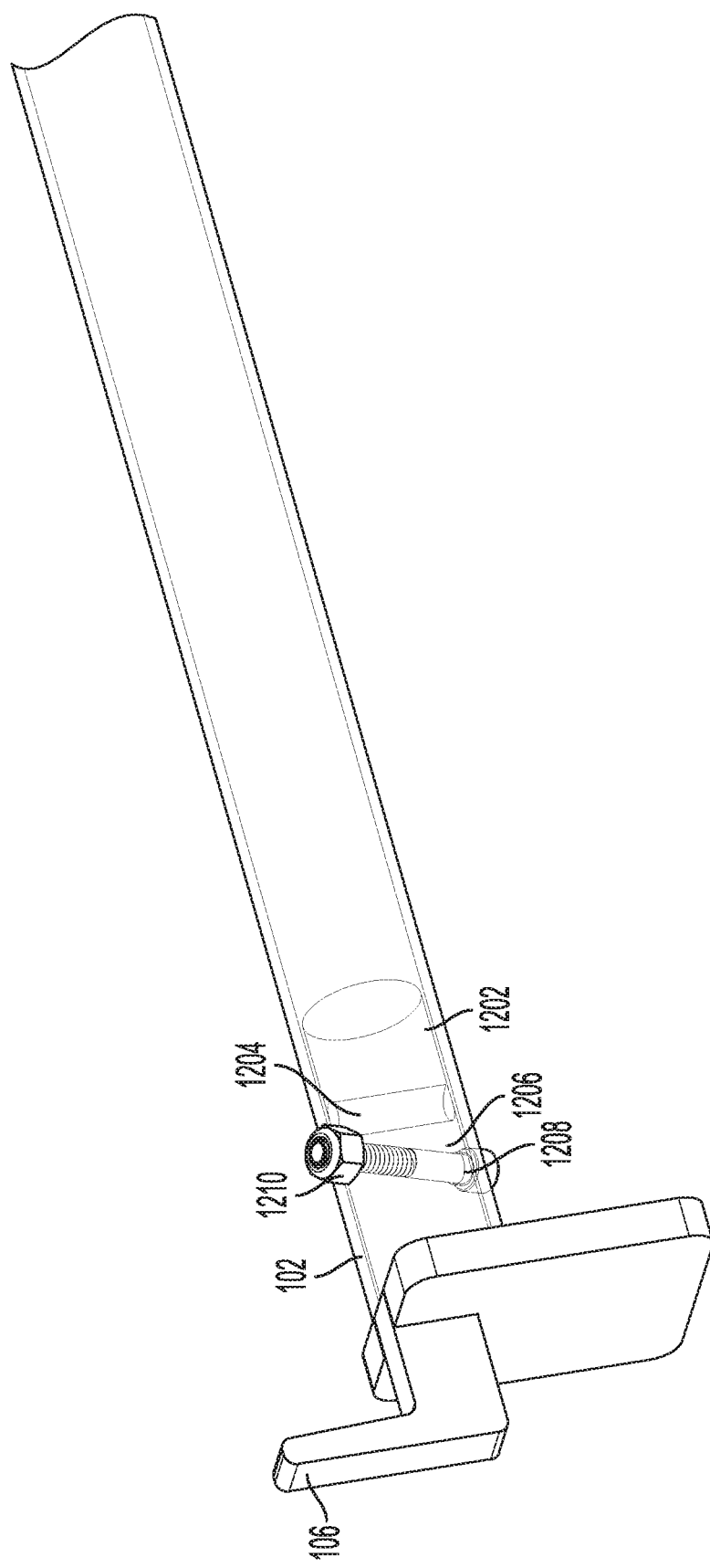
FIG. 14 depicts the coupling of the sliding rod assembly to the first hook assembly.

FIG. 14 depicts the coupling of sliding rod assembly 102 to first hook assembly 106. Both sliding rod assembly 102 and peg 1202 are shown in phantom so the coupling can be observed. As shown, peg 1202 is inserted into an open end of sliding rod assembly 102. Either bore 1204 or bore 1206 is then lined up with corresponding through holes on sliding rod assembly 102. Bolt 1208 is placed through bore 1206, for example, and then secured with nut 1210 on an opposing side of sliding rod assembly 102. Second hook assembly 108 is secured to tube assembly 104 in an identical manner.

Figure 15:
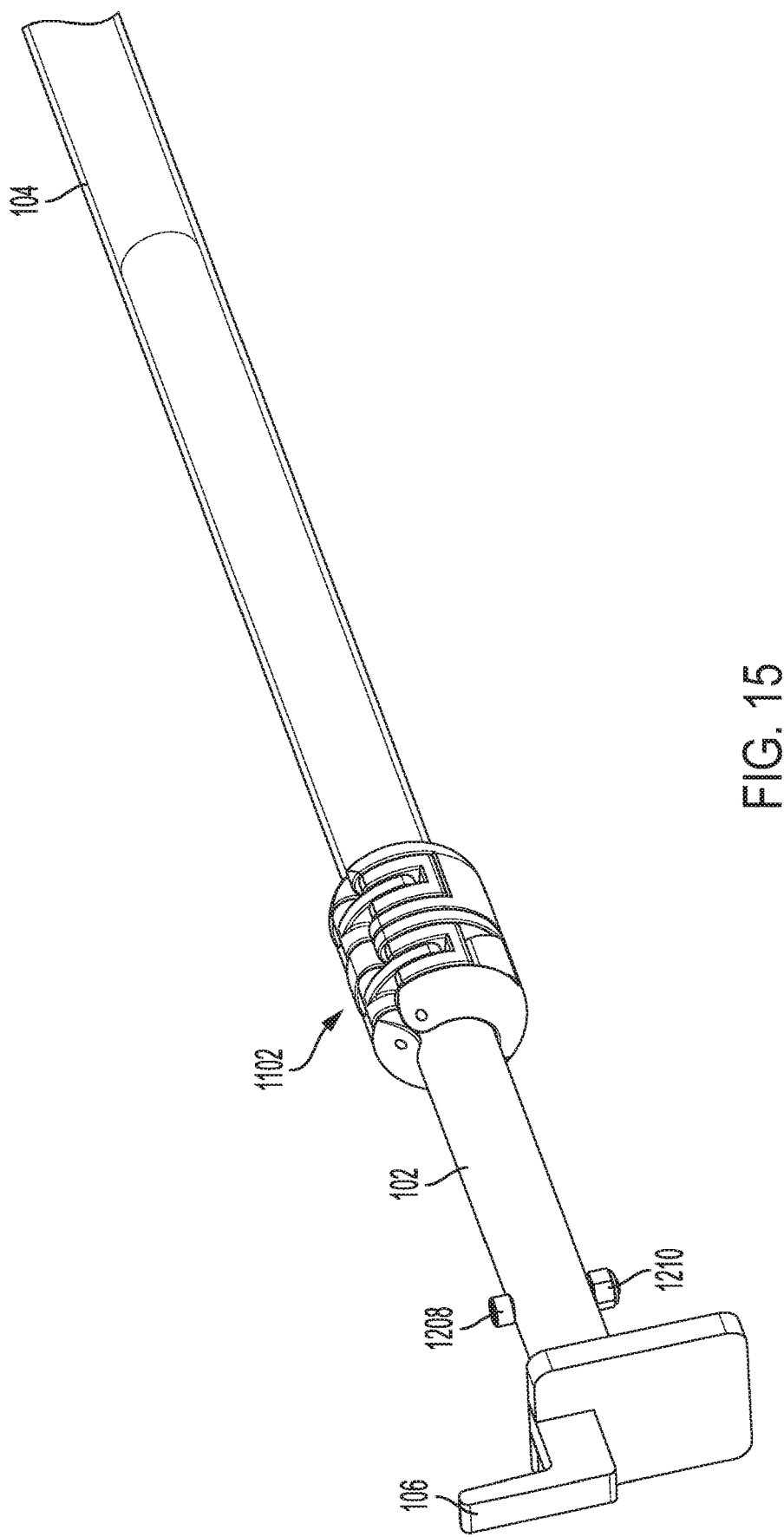
FIGS. 15 and 16 depict cutaway views showing the connection between the sliding rod assembly and the tube assembly using a fixing clamp.
Figure 16:
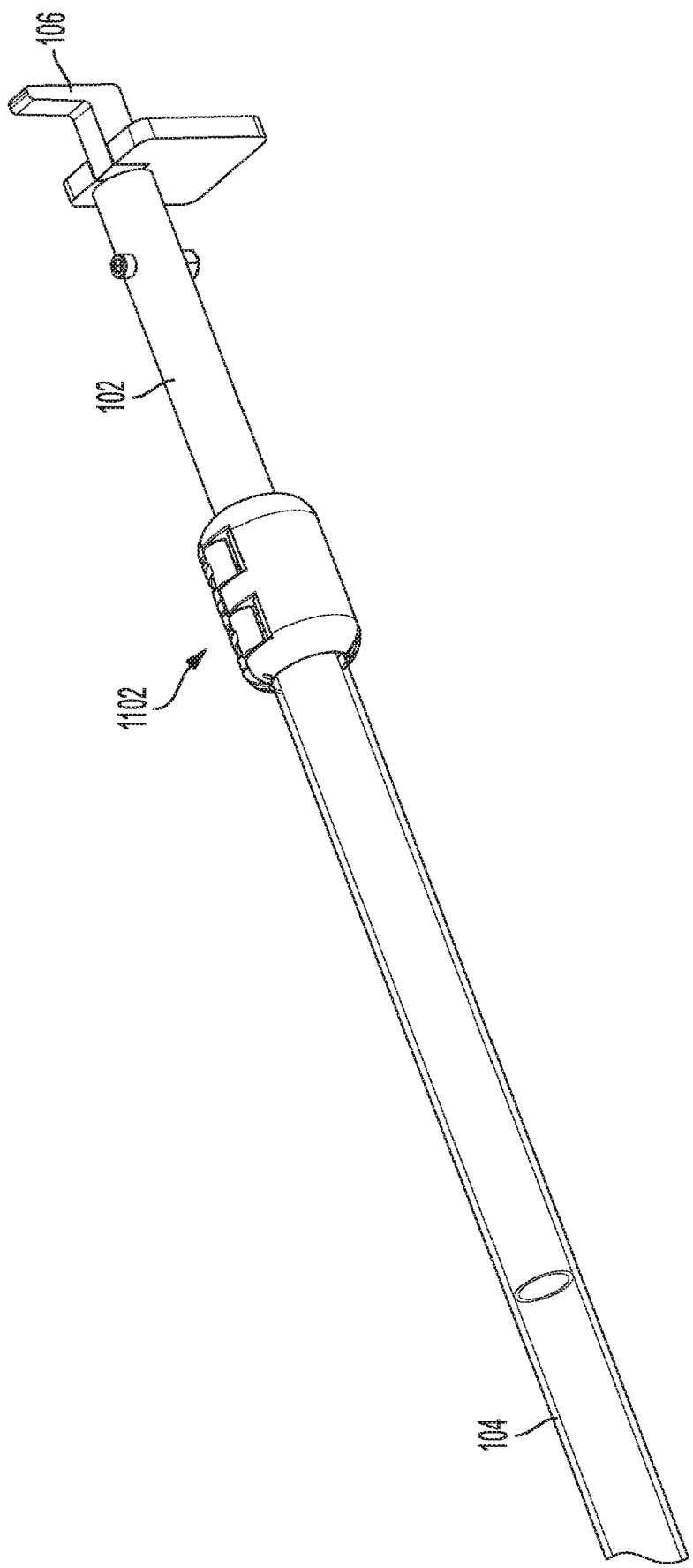

FIGS. 15 and 16 depict cutaway views of the ends of adjustable shoring beam 100 showing the connection between sliding rod assembly 102 and tube assembly 104 using fixing clamp 1102. Tube assembly 104 is shown in phantom in both drawings to show how rod assembly 102 is inserted and slides within tube assembly 104. Fixing clamp 1102 is adjustable between an open and a closed position. When fixing clamp 1102 is open, the length of adjustable shoring beam 100 can be adjusted by sliding rod assembly 102 in/out of tube assembly 104. Closing fixing clamp 1102 locks movement of sliding rod assembly 102 with respect to tube assembly 104. Rod assembly 102 can be replaced by removing it from the end of tube assembly 104 when fixing clamp 1102 is in the open position. This also allows fixing claim 1102 to be replaced. Fixing clamp 1102, rod assembly 102, or tube assembly 104 can all be interchanged with other adjustable shoring beams 100, if need, for maintenance or repair. This allows all parts of adjustable shoring beam 100 to be replaced if needed, including first hook assembly 106 and second hook assembly 108.

Figure 17:
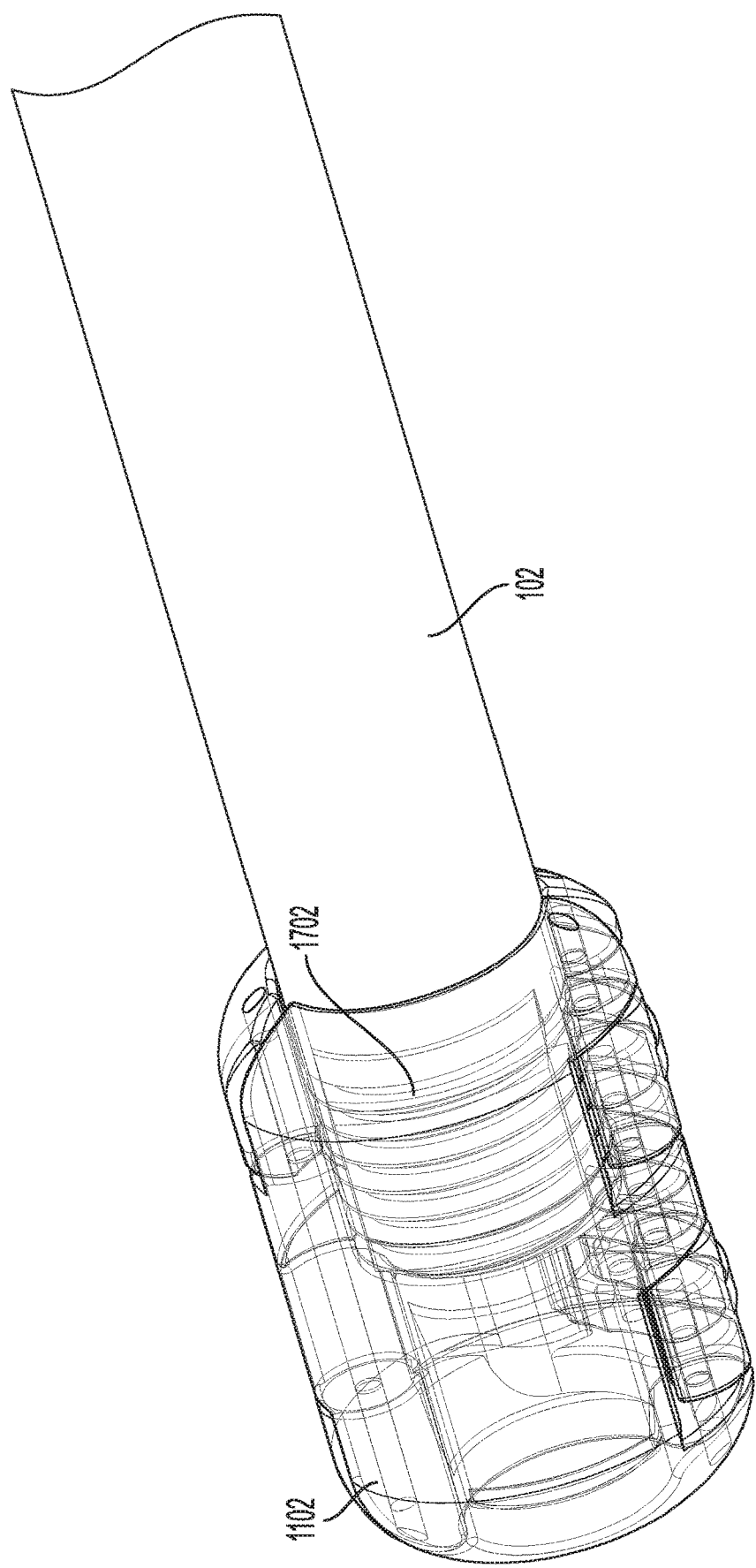
FIG. 17 depicts the fixing clamp in phantom coupled to the end of the tube assembly.

As should be obvious, the diameter of rod assembly 102 is less than that of tube assembly 104 so that rod assembly 102 can slide within tube assembly 104. In order to accommodate the differing diameters, fixing clamp 1102 has a construction in which a first side has an inner diameter that is smaller than that of a second side. FIG. 17 depicts fixing clamp 1102, shown in phantom, fixed to an end of tube assembly 104. The end of tube assembly 104 preferably comprises protrusions 1702 which engage with an interior of fixing clamp 1102 when it is in the closed position. Protrusions 1702 are preferably formed of a plurality of circular and evenly spaced rings. However, protrusions 1702 may also be formed from a single spiral, similar to a raised thread on the exterior of rod assembly 102.

Figure 18:
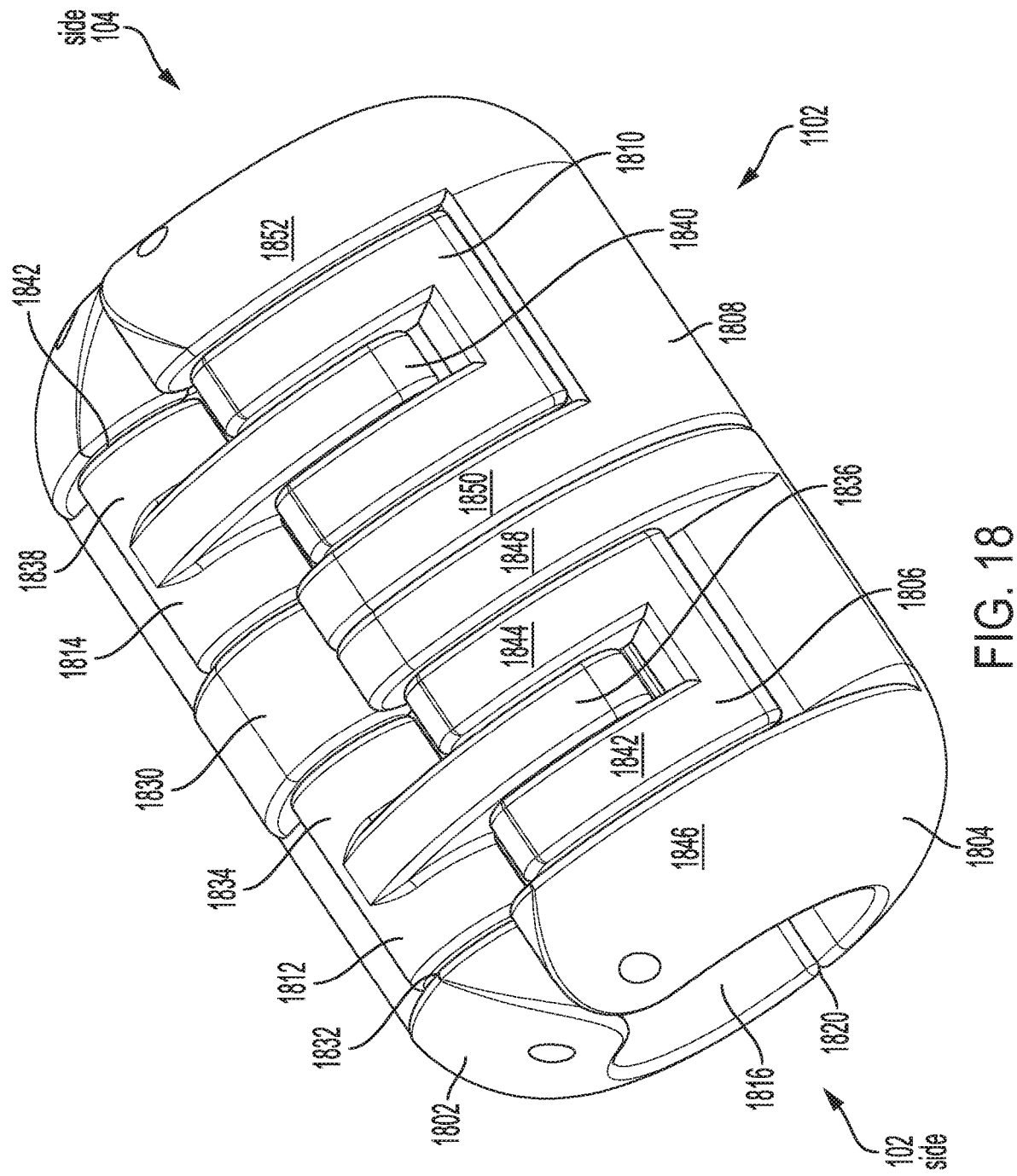
FIGS. 18 and 19 depict views of the fixing clamp in isolation.
Figure 19:
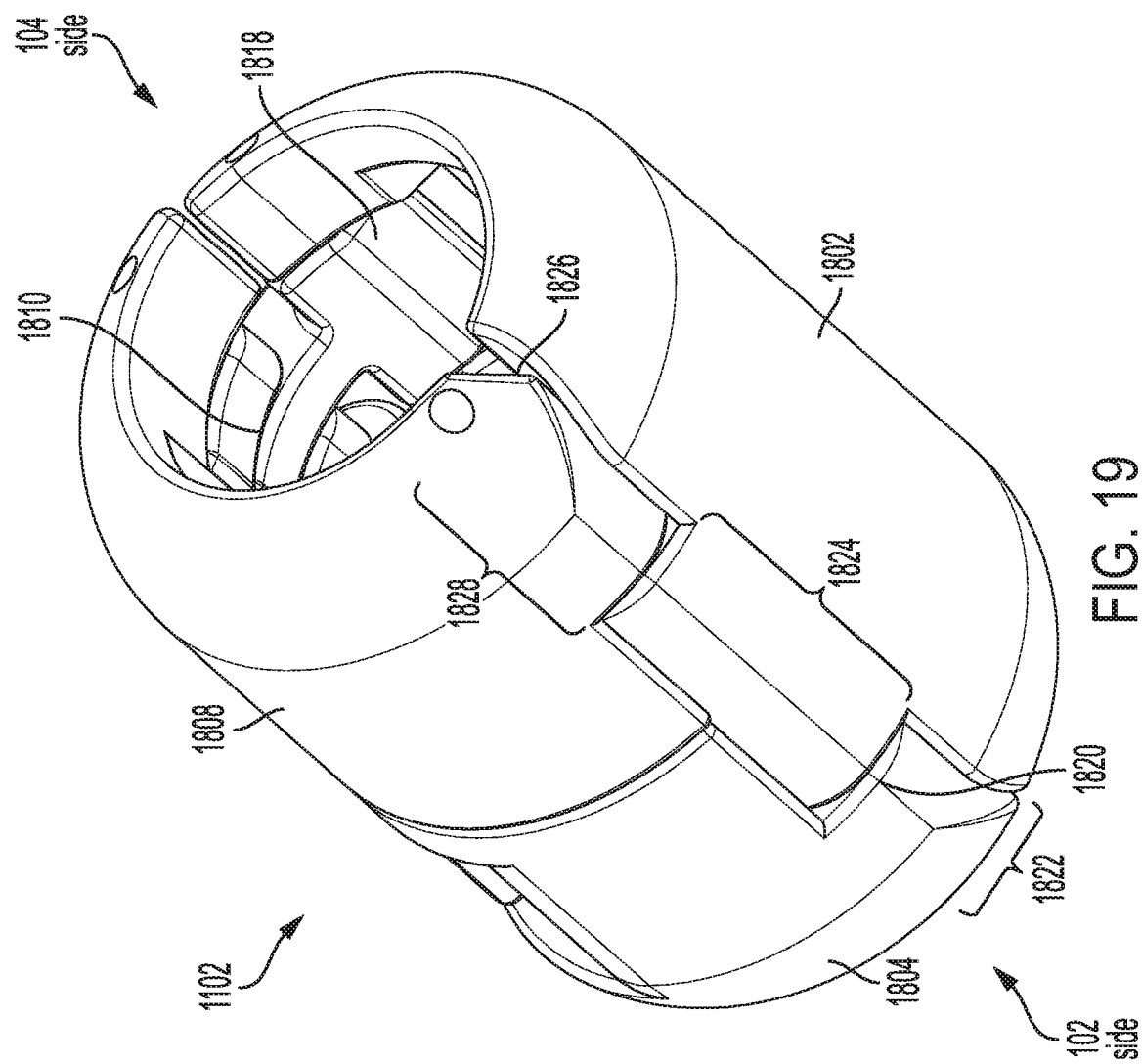

FIGS. 18 and 19 depict views of fixing clamp 1102 in isolation. Fixing clamp 1102 comprises clamp body 1802, first arcuate member 1804, first handle 1806, second arcuate member 1808, second handle 1810, first latch member 1812, second latch member 1814, first opening 1816, and second opening 1818. First opening 1816 is sized to accommodate rod assembly 102 whereas second opening 1818, which is larger than first opening 1816, is sized to accommodate tube assembly 104. Fixing clamp 1102 functions in a similar manner to a quick clamp used to grip circular bars. However, fixing clamp 1102 is able to simultaneously grip circular bars of different diameters as will be described.

First arcuate member 1804 is rotatable with respect to clamp body 1802 about first hinge 1820. First hinge 1820 is formed by a pin placed through first hinge section 1822 of first arcuate member 1804 and into body hinge section 1824 of clamp body 1802.

Second arcuate member 1808 is rotatable with respect to clamp body 1802 about second hinge 1826. Second hinge 1826 is formed by a pin placed through second hinge section 1828 and into body hinge section 1824. In some embodiments, a single pin may be used and inserted through first hinge section 1822, body hinge section 1824, and second hinge section 1828 simultaneously.

First latch member 1812 comprises first latch body 1834 and first latch extension 1836. A pin is placed through clamp body 1802, through first latch body 1834, and into second body hinge section 1832 so that first latch member 1812 is rotatable with respect to clamp body 1802 about first latch hinge 1832.

Second latch member 1814 comprises second latch body 1838 and second clamp extension 1840. A pin is placed through clamp body 1802, through second latch body 1838, and into second body hinge section 1832 so that second latch member 1812 is rotatable with respect to clamp body 1802 about second latch hinge 1842.

Figure 20:
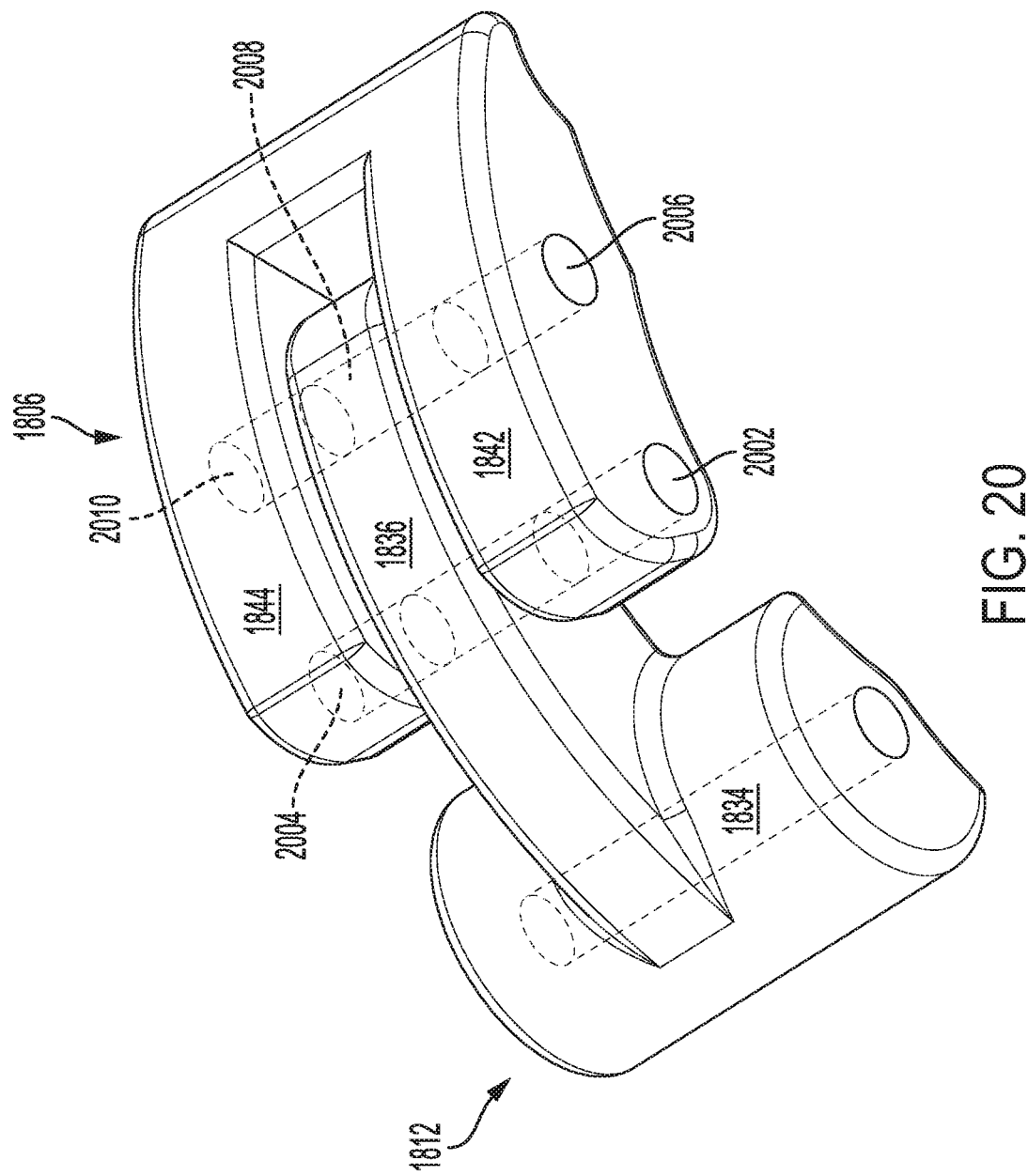
FIGS. 20 and 21 depict the first handle and the first latch member in isolation.
Figure 21:
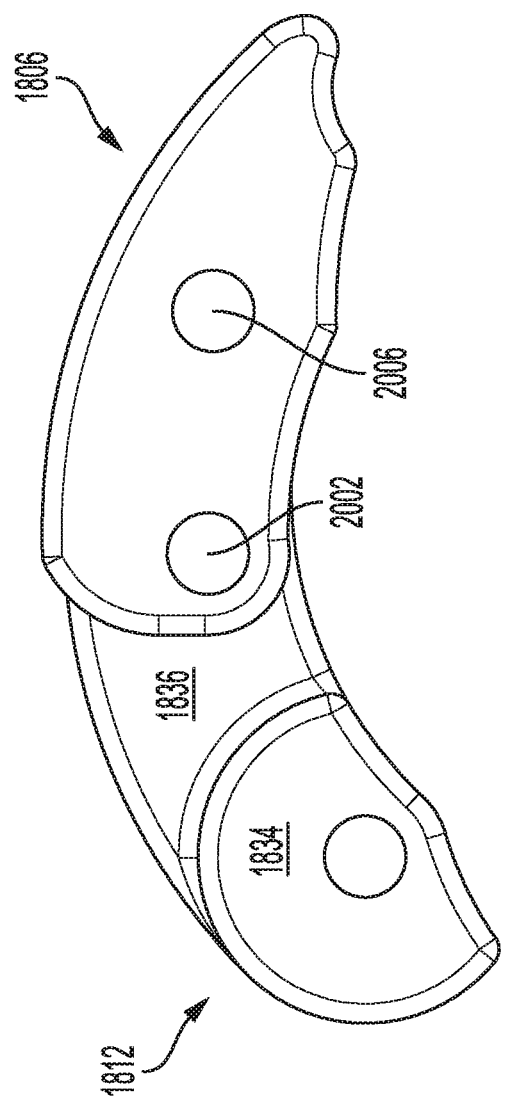

FIGS. 20 and 21 depict first handle 1806 and first latch member 1812 in isolation to show how they are coupled together. As best depicted in FIG. 20, first handle 1806 is U-shaped. The end of first latch arm 1842 comprise first openings 2002. A first latch arm 1842 is coupled to first arcuate member 1804 by a pin placed through first arcuate projection 1846 and into first latch arm 1842, with the pin's extension terminating before first latch extension 1836.

Similarly, a pin is placed through opening 2004 in first latch arm 1844 and first arcuate projection 1848. A first end of the pin terminates at first latch extension 1836 and a second end of the pin terminates before second arcuate member 1850.

First latch extension 1836 has a channel 2008 which aligns with channel 2006 in first latch arm 1842 and channel 2010 in second latch arm 1842. A pin is placed through channel 2006, channel 2008, and channel 2010. A first end of the pin terminates at an end of channel 2006 and a second end of the pin terminates at an end of channel 2010. The pin rotatably couples first handle 1806 to first latch member 1812.

FIG. 21 depicts a side view of the coupling between first latch member 1812 and first handle 1806. As shown, opening 2002 terminates at first latch extension 36 whereas channels 2006, 2008, and 2010 form a continuous channel.

Figure 22:
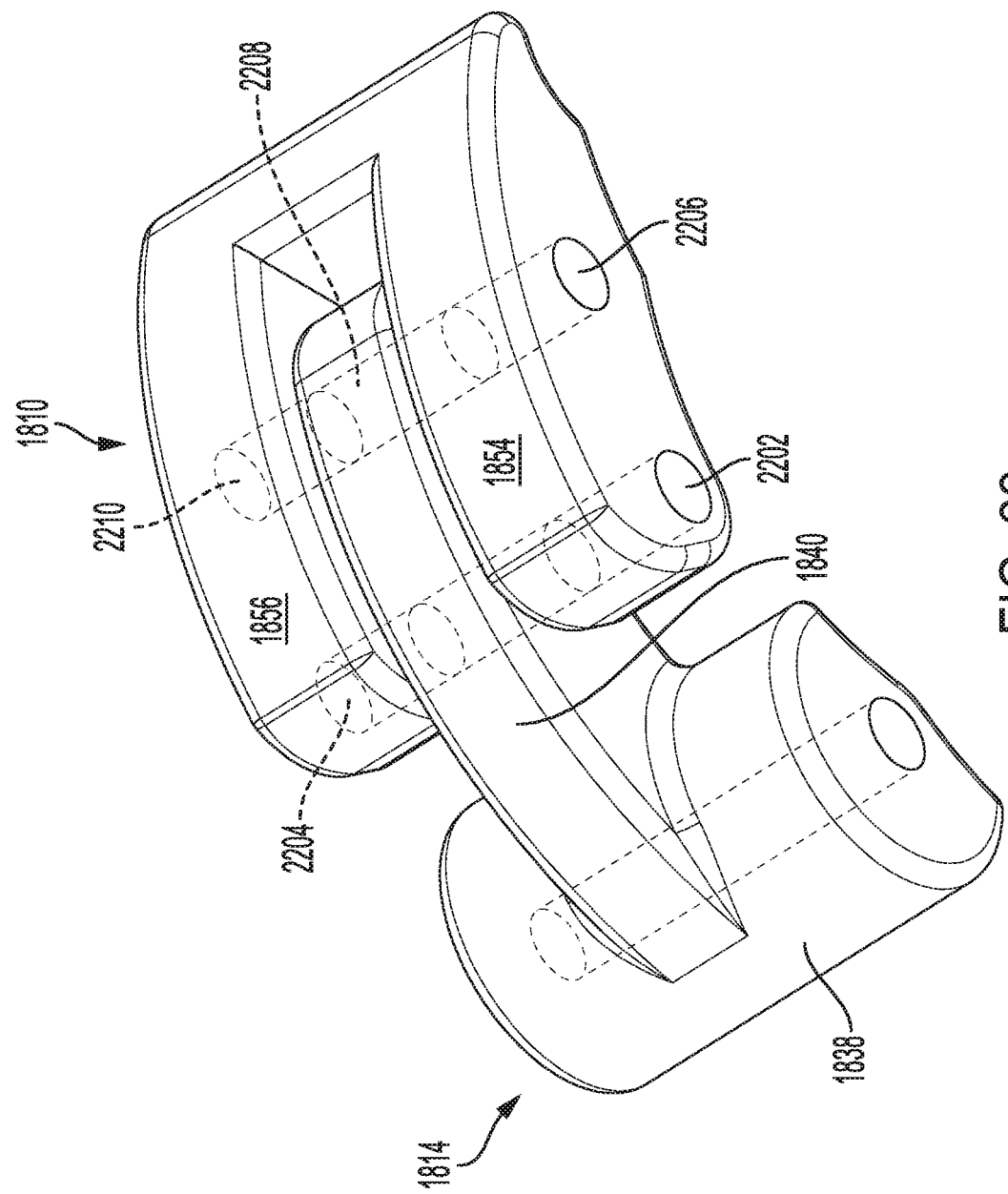
FIG. 22 depicts a perspective view of the second handle and second latch member in isolation.

FIG. 22 depicts second handle 1810 and second latch member 1814 in isolation to show how they are coupled together. Second handle 1810 is U-shaped. The end of second latch arm 1854 comprises opening 2002. A second latch arm 1854 is coupled to second arcuate member 1808 by a pin placed through second arcuate projection 1850 and into second latch arm 1854, with the pin's extension terminating before second latch extension 1840.

Similarly, a pin is placed through opening 2204 in second latch arm 1856 and second arcuate projection 1852. A first end of the pin terminates at second latch extension 1840.

Second latch extension 1840 has a channel 2208 which aligns with channel 2206 in second latch arm 1854 and channel 2210 in second latch arm 1856. A pin is placed through channel 2206, channel 2208, and channel 2210. A first end of the pin terminates at an end of channel 2206 and a second end of the pin terminates at an end of channel 2210. The pin rotatably couples second handle 1810 to second latch member 1814.

Figure 23:
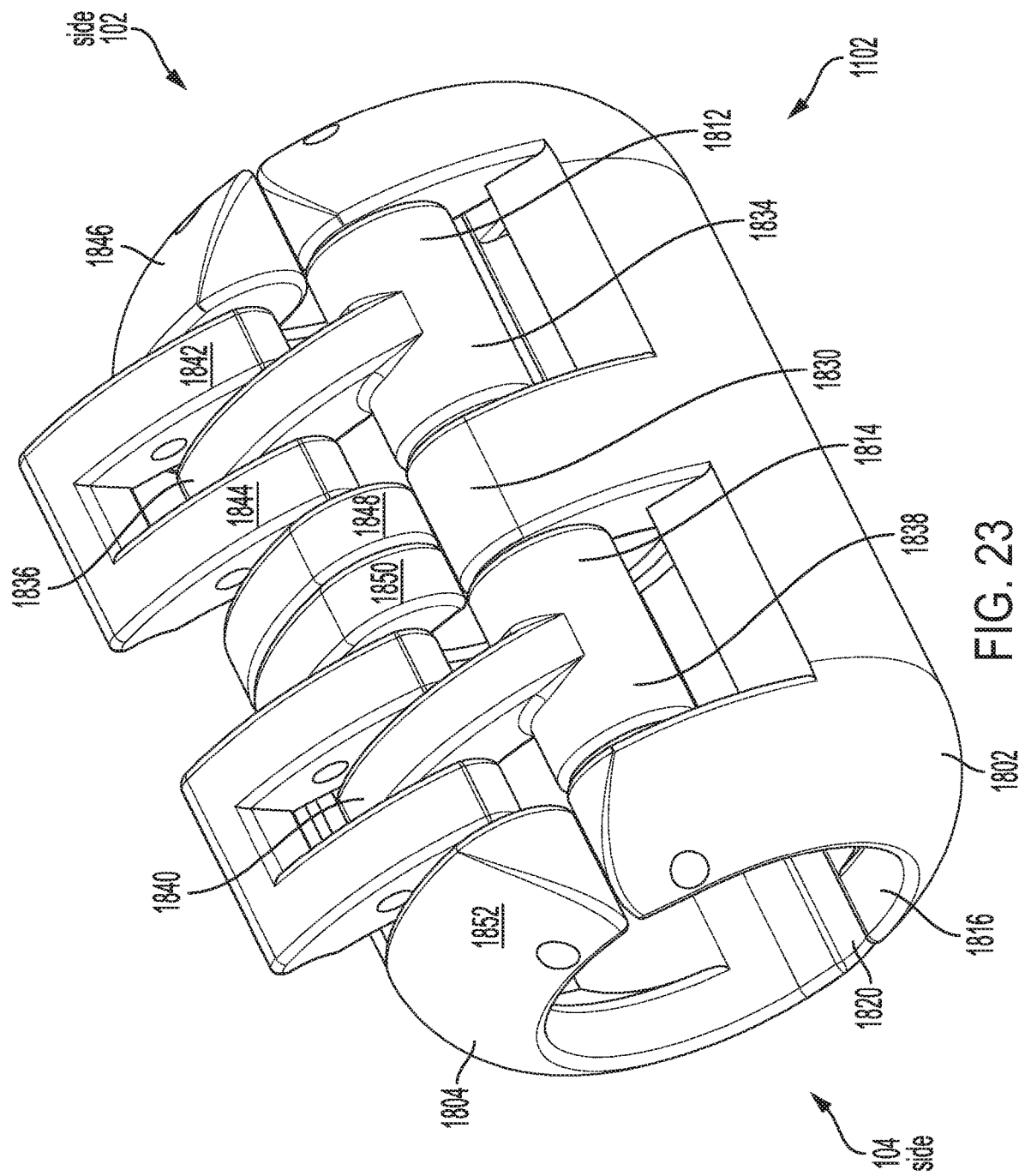
FIG. 23 depicts a perspective view of the fixing clamp in an open configuration.

As shown in FIG. 23, lifting first handle 1806 allows clamp body 1802 and first arcuate member 1804 to rotate relative to each other about hinge 1820. The rotation is limited through the coupling of first latch member 1812 to clamp body 1802 and first handle 1806 to first arcuate member 1804. By opening and closing first handle 1802, the rod assembly 102 can be moved and then locked in position.

Lifting second handle 1810 allows clamp body 1802 and second arcuate member 1808 to rotate relative to each other about second hinge 1826. The rotation is limited through the coupling of second latch member 1814 to clamp body 1802 and second handle 1810 to second arcuate member 1808. By opening and closing second handle 1810, the tube assembly 104 can be moved and then locked in position. FIG. 17 depicts fixing clamp 1102 coupled to tube assembly 104 when second handle 1810 is in the closed position.

Figure 24:
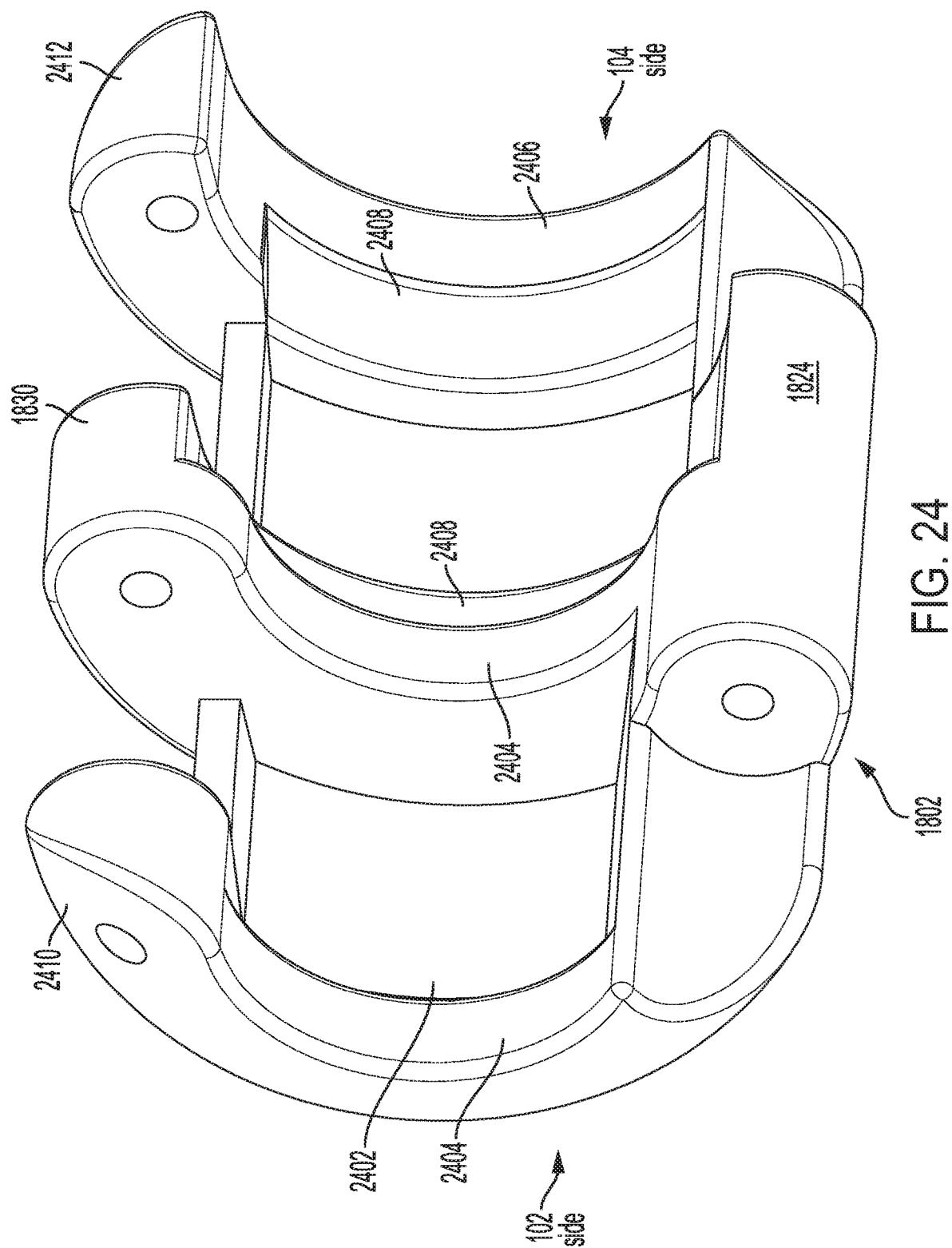
FIGS. 24 and 25 depict interior views of the clamp body in isolation.
Figure 25:
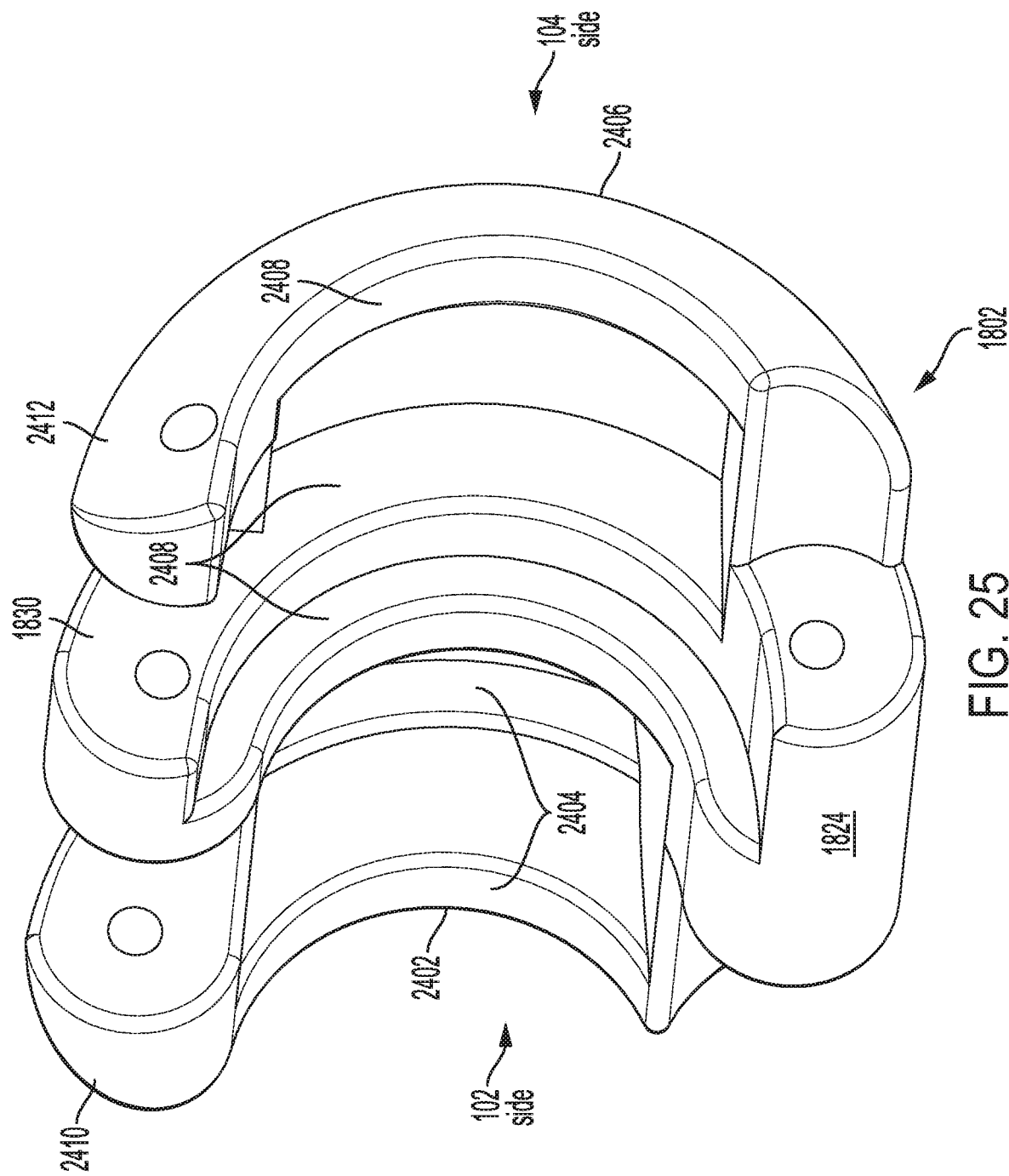

FIGS. 24 and 25 depict the interior of clamp body 1802 in isolation. A first side 2402 of clamp body 1802 has at least two or more arcuate ribs 2404 having a first curvature. A second side 2406 has a plurality of arcuate ribs having a second curvature larger than the first curvature. A rib at the boundary of first side 2402 and second side 2404 has a first side with the first curvature and a second stepped side having the second curvature.

The first curvature is preferably the same or slightly smaller than that of rod assembly 102 so that rod assembly 102 can be gripped by fixing clamp 1102 when first handle 1806 is in the closed position. Arcuate ribs 2402 may be covered with a friction surface such as a rough plastic or metal. The covering of arcuate ribs 2402 may also comprise a compressible material to accommodate a range of sizes of rod assembly 102.

The second curvature is preferably the same or slightly smaller than that of tube assembly 104, but still greater than the first curvature. This allows arcuate ribs 2408 to grip tube assembly 104 when second handle 1810 is in the closed position and depicted in FIG. 17. The stepped rib having both curvatures at the intersection of first side 2402 and second side 2404 prevents rod assembly 104 being inserted into fixing clamp 1102 past the end of second side 2406, even when the second handle 1810 is in the open position.

The area between arcuate ribs 2404 and arcuate ribs 2408 is preferably recessed, smoothed, and curved. This allows clamp body 1802 to have reduced weight.

Clamp arm 2410, clamp arm 2412, and second body hinge section 1830 all have channels for the aforementioned described pins. In some embodiments, a single pin is inserted into clamp arm 2410, first latch body 1834, second body hinge section 1830, second latch body 1838, and clamp arm 2412. Similarly, a single long pin can be inserted through second hinge section 1828, body hinge section 1824, and first hinge section 1822 to simultaneously form first hinge 1820 and second hinge 1826 as already described.

Figure 26:
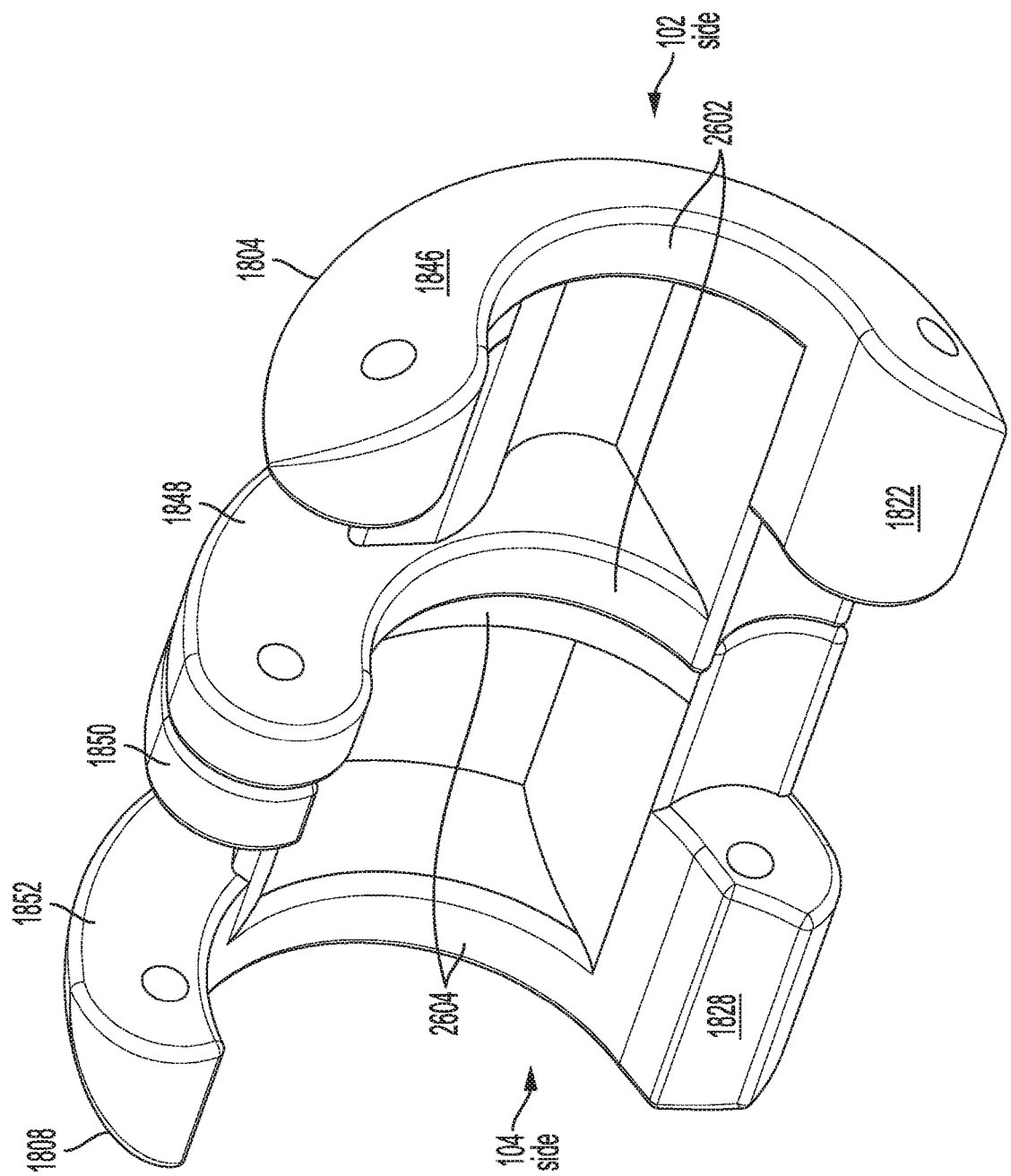
FIGS. 26 and 27 depict interior views of the first arcuate member and the second arcuate member together.
Figure 27:
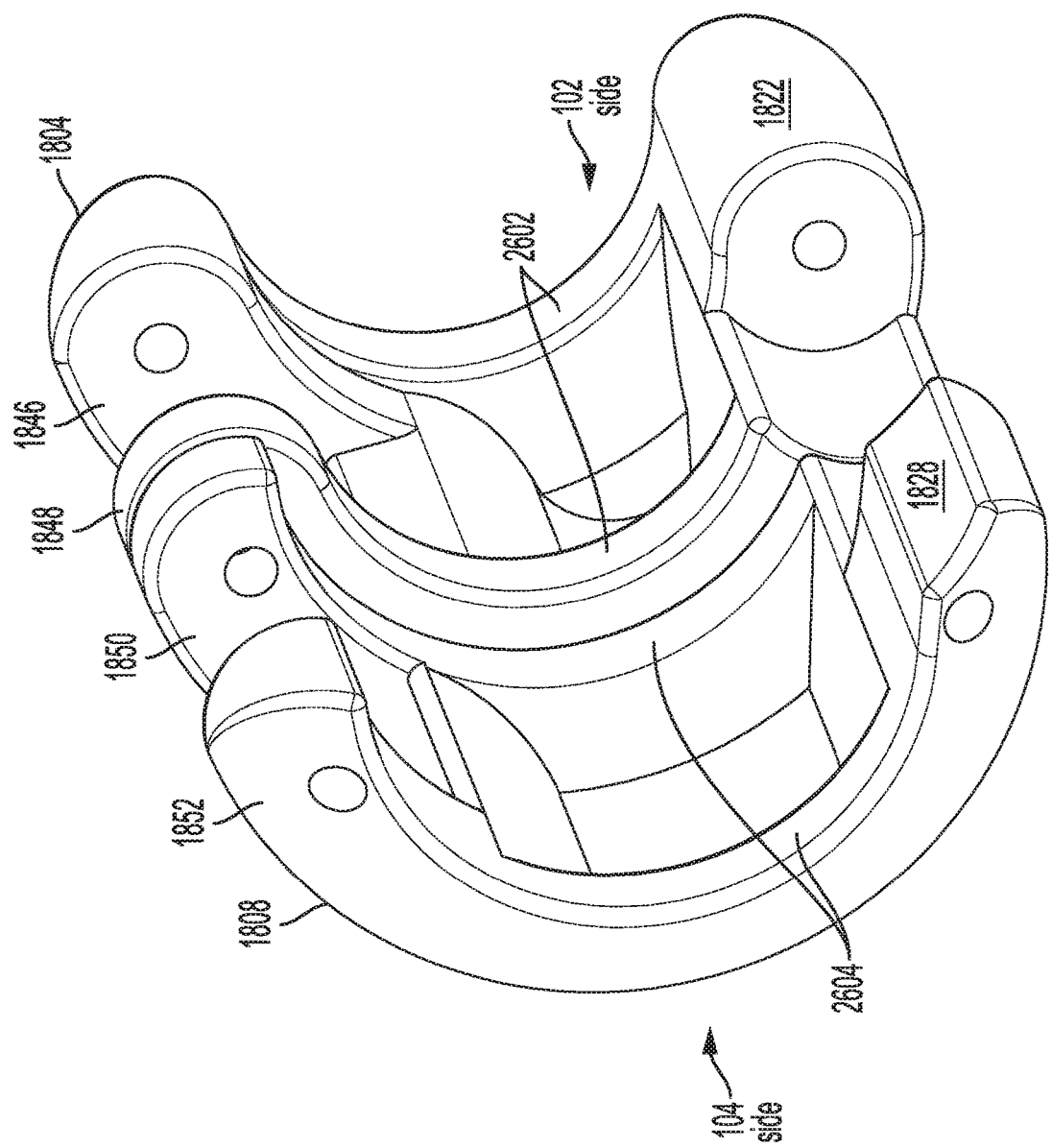

FIGS. 26 and 27 depict the interiors of first arcuate member 1804 and second arcuate member 1808 in isolation. First arcuate member 1804 and second arcuate member 1808 are able to rotate independently of each other about first hinge 1820 and second hinge 1826.

First arcuate member 1804 comprises at least two arcuate ribs 2602 having the first curvature. Arcuate ribs 2602 in combination with arcuate ribs 2408 form opening 1816 of fixing clamp 1102.

Second arcuate member 1810 comprises at least two arcuate ribs 2604 having the second curvature. Arcuate ribs 2604 in combination with arcuate ribs 2404 form opening 1818. It should be apparent to one of ordinary skill in the art that the number of ribs for arcuate ribs 2404, 2408, 2602, and 2604 may be increased if required or needed.

Figure 28:
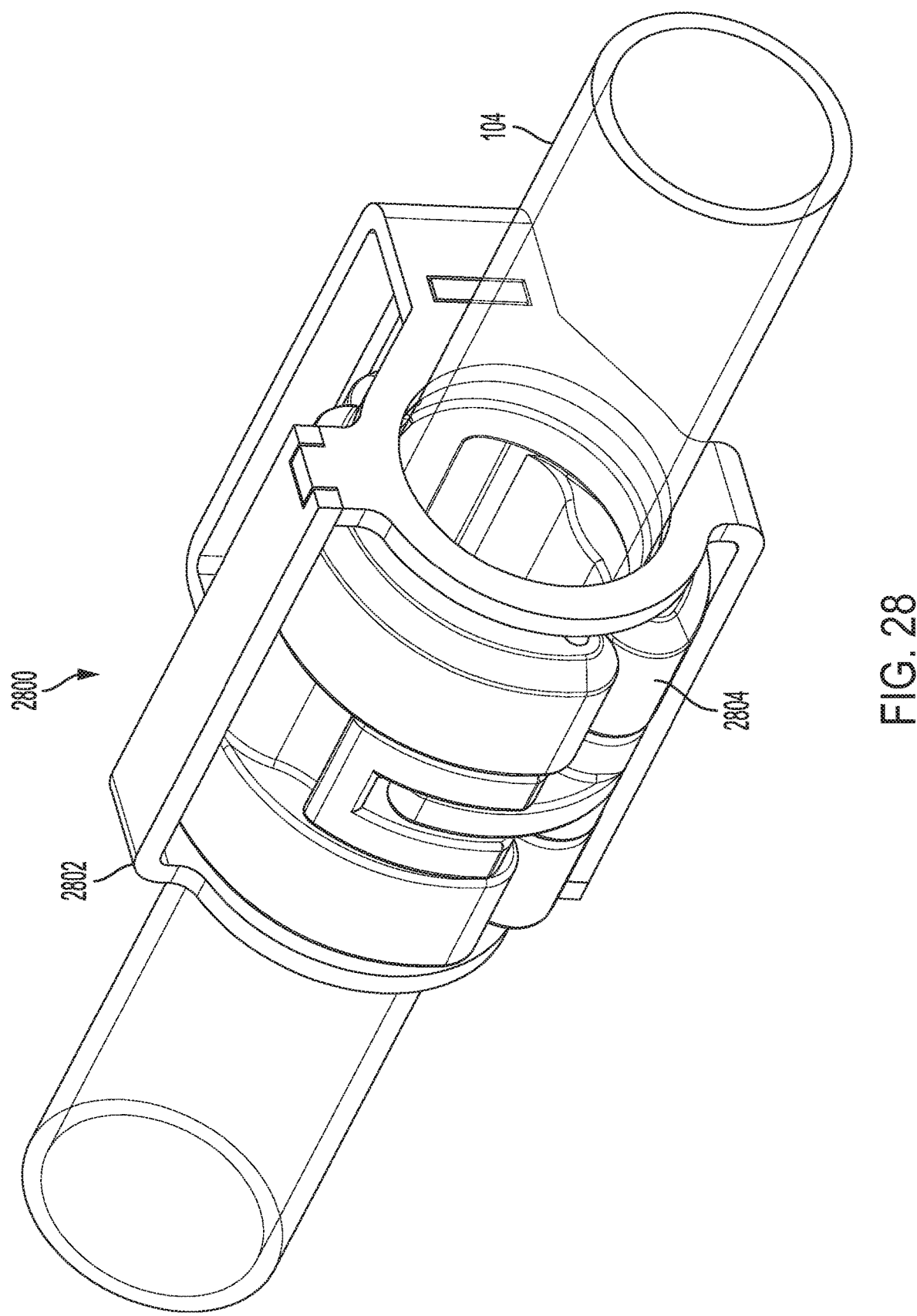
FIG. 28 depicts a perspective view of the connection assembly coupled to the tube assembly.

Turning next to FIG. 28, depicted is connection assembly 2800 which can be utilized to connect any adjustable shoring beam 100 to another adjustable shoring beam 100 at a perpendicular angle. Connection assembly 2800 generally comprises bracket 2802 and connection clamp 2804. Connection clamp 2804 is configured to slide anywhere along tube assembly 104 or rod assembly 102 and locked in position. FIG. 28 depicts connection assembly located on a tube assembly 104 of an adjustable shoring beam 100. However, it should be apparent that connection assembly 2800 can be utilized to couple any item ending with an E-track hook to a pole or an adjustable shoring beam 100.

Figure 29:
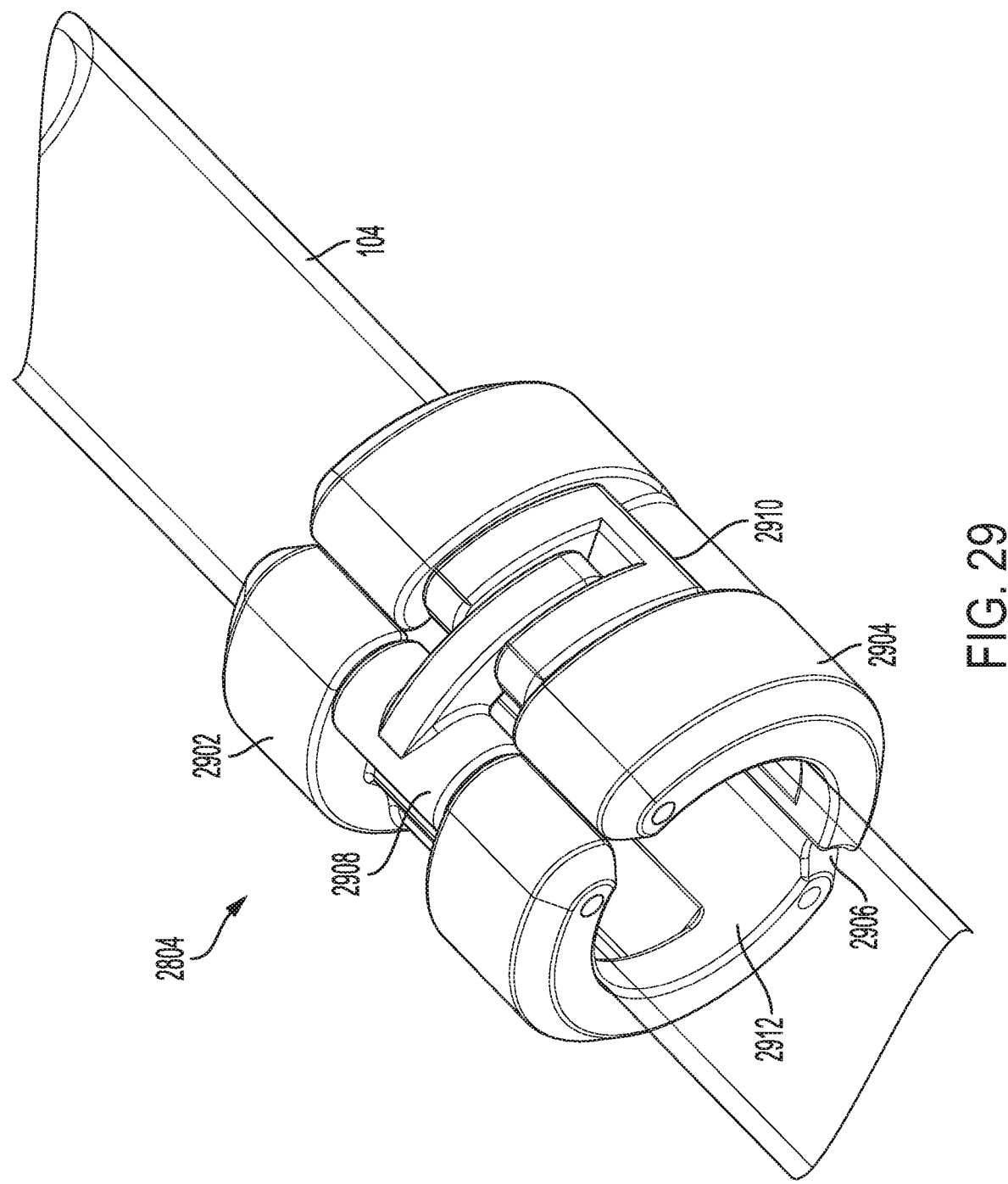
FIG. 29 depicts a perspective view of the connection clamp without the bracket.

Connection clamp 2804 is depicted in FIG. 29 without bracket 2802. The parts of connection clamp 2804 are preferably formed from injection molded plastic and the pins used for the hinges are steel. Connection clamp 2802 generally comprises first arcuate member 2902, second arcuate member 2904, latch 2908, and handle 2910. First arcuate member 2902 is rotatably coupled to second arcuate member 2904 at hinge 2906. The position of connection clamp 2802 along tube assembly 104 can be adjusted by raising the handle 2910 to cause first arcuate member 2902 to rotate away from second arcuate member 2904, increasing the size of opening 2912. Once connection clamp 2802 has been positioned, handle 2910 can be closed so that connection clamp 2802 clamps onto tube assembly 104.

Figure 30:
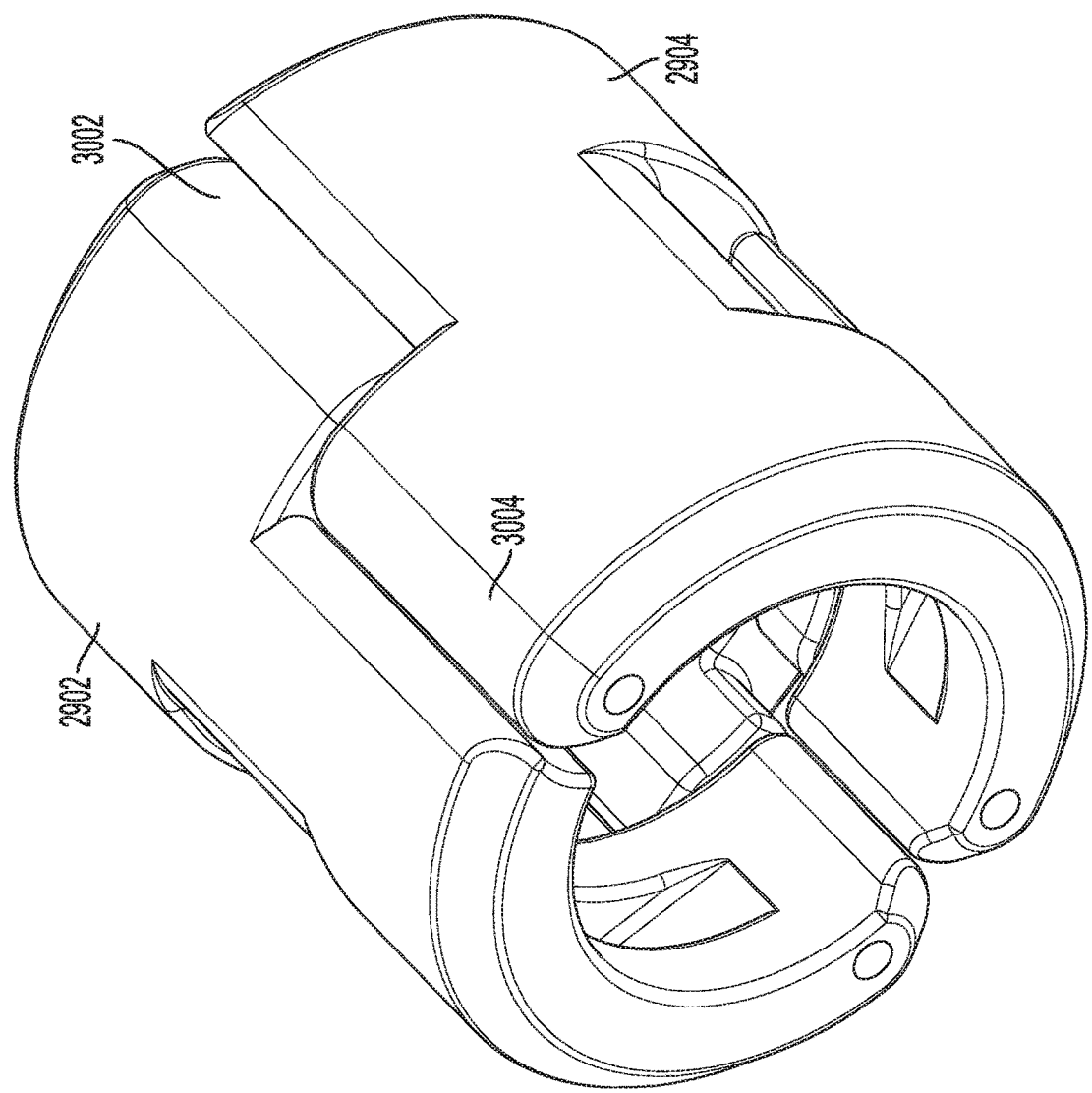
FIG. 30 depicts a rear view of the connection clamp in isolation.

FIG. 30 depicts a rear view of connection clamp 2804. First arcuate member 2902 comprises hinge section 3002 which is complimentary to hinge section 3004 of second arcuate member 2904. A pin placed through a channel in first arcuate member 2902 and second arcuate member 2904 allows first arcuate member 2902 to rotate about hinge 2906 with respect to second arcuate member 2904.

Figure 31:
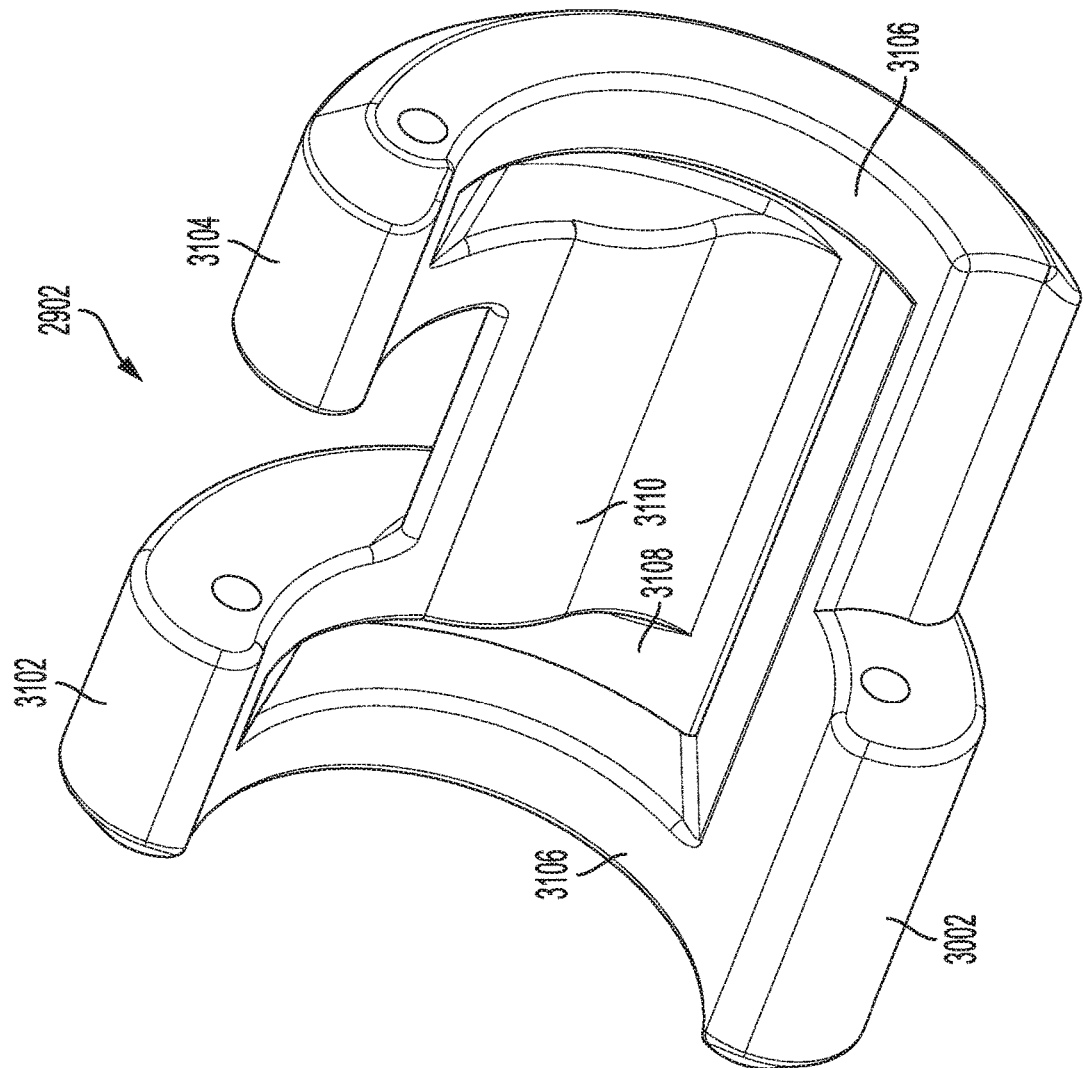
FIG. 31 depicts an interior view of the first arcuate member of the connection clamp.

FIG. 31 depicts an interior view of first arcuate member 2902. First arcuate member 2902 further comprises first arm 3102 and second arm 3104. A pin placed through first arm 3102, latch 2908, and second arm 3104 allows latch 2908 to rotate between first arm 3102 and second arm 3104. Ribs 3106 have a curvature approximately the same or slightly smaller than the tube on which connection clamp 2804 is placed, which in this example is tube assembly 104. Recess 3108 and protrusion 3110 are located between ribs 3106. Protrusion 3110 is pressed against tube assembly 104 when connection clamp 2804 is in the closed position and helps to prevent it from sliding.

Figure 32:
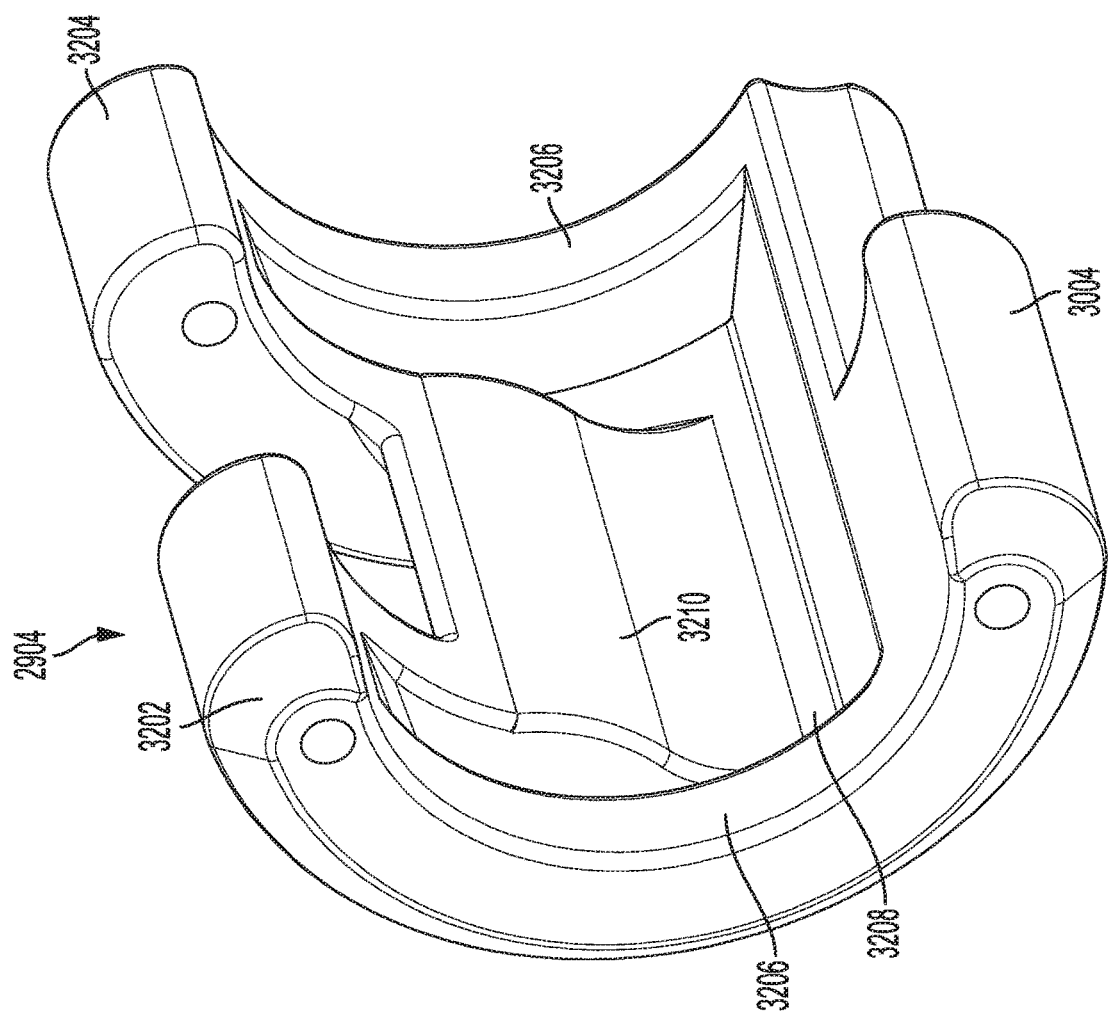
FIG. 32 depicts an interior view of the second arcuate member of the connection clamp.

FIG. 32 depicts an interior view of second arcuate member 2904. Second arcuate member 2904 further comprises first arm 3202 and second arm 3204. A pin placed through first arm 3202, handle 2910, and second arm 3204 allows handle 2910 to rotate between first arm 3202 and second arm 3202. Ribs 3206 have a curvature approximately the same or slightly smaller than the tube on which connection clamp 2804 is placed, which in this example is tube assembly 104. Recess 3208 and protrusion 3210 are located between ribs 3206. Protrusion 3210 is pressed against tube assembly 104 when connection clamp 2804 is in the closed position and helps to prevent it from sliding. As should be obvious from FIGS. 31 and 32, first arcuate member 2902 and second arcuate member 2904 are complimentary mirror images of each other.

Figure 33:
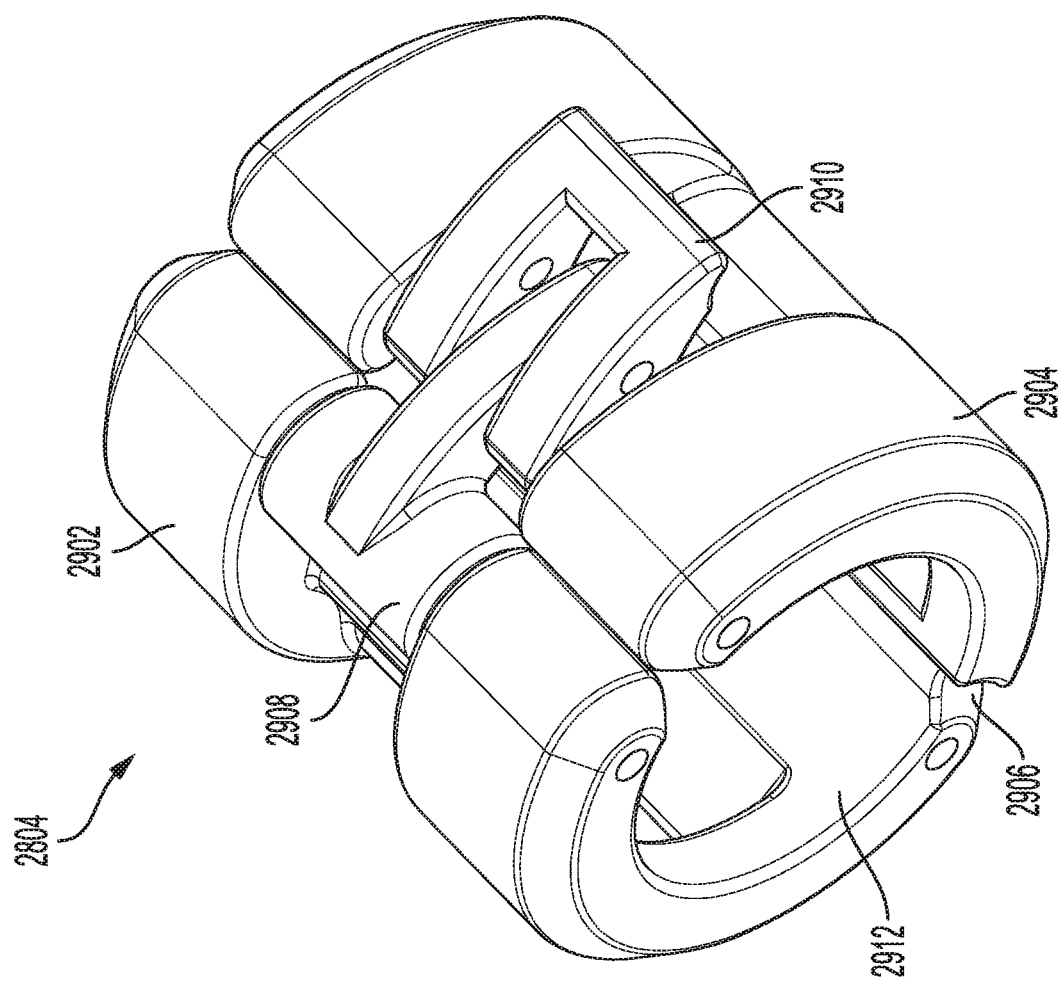
FIG. 33 depicts the connection clamp in an open configuration.

FIG. 33 depicts connection clamp 2804 in an open configuration. As shown, lifting handle 2910 allows first arcuate member 2902 and second arcuate member 2904 to open about joint 2906, allowing for adjustment of connection clamp 2804 along the length of adjustable shoring beam 100.

Figure 34:
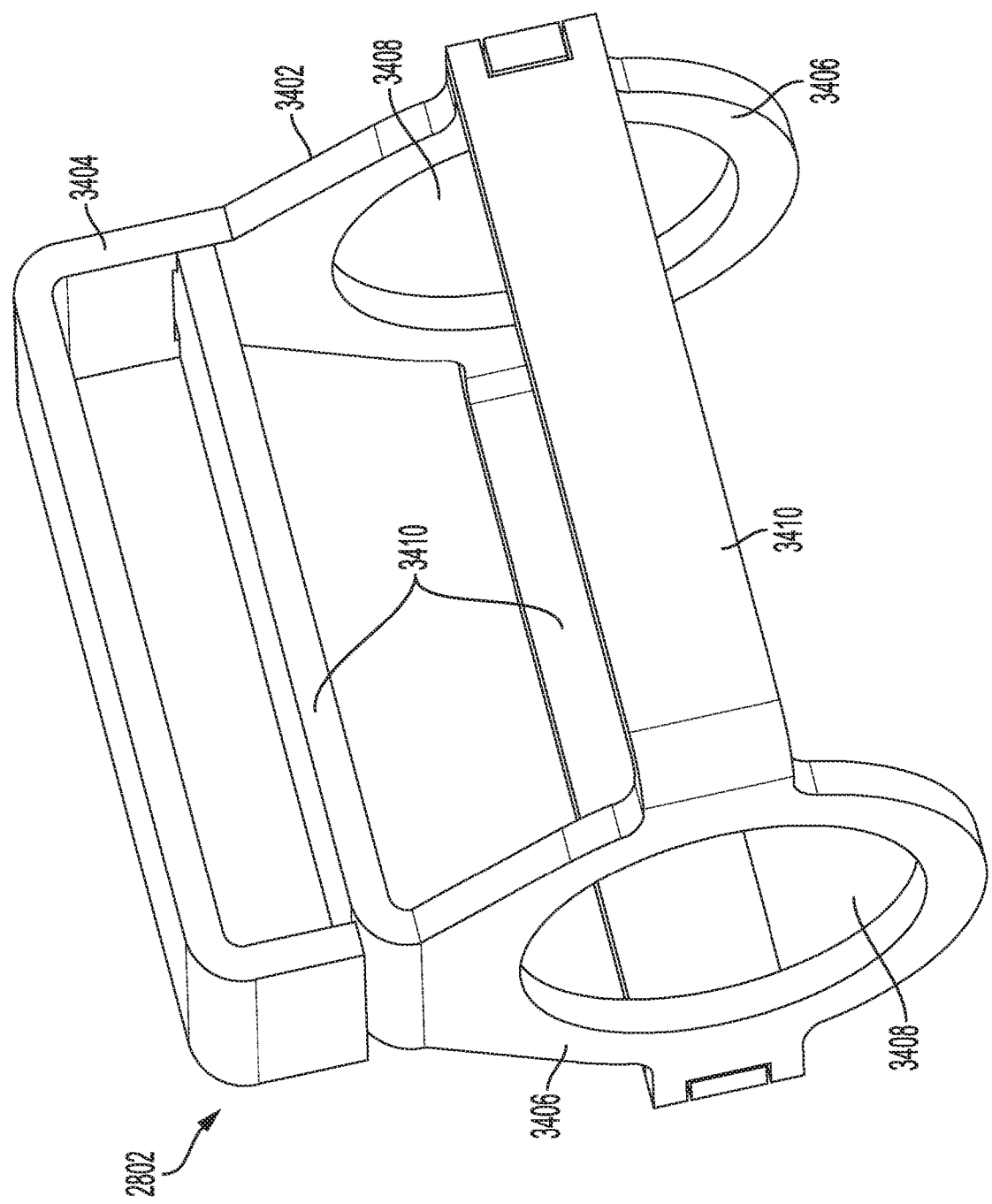
FIGS. 34-36 depict views of the bracket in isolation.
Figure 35:
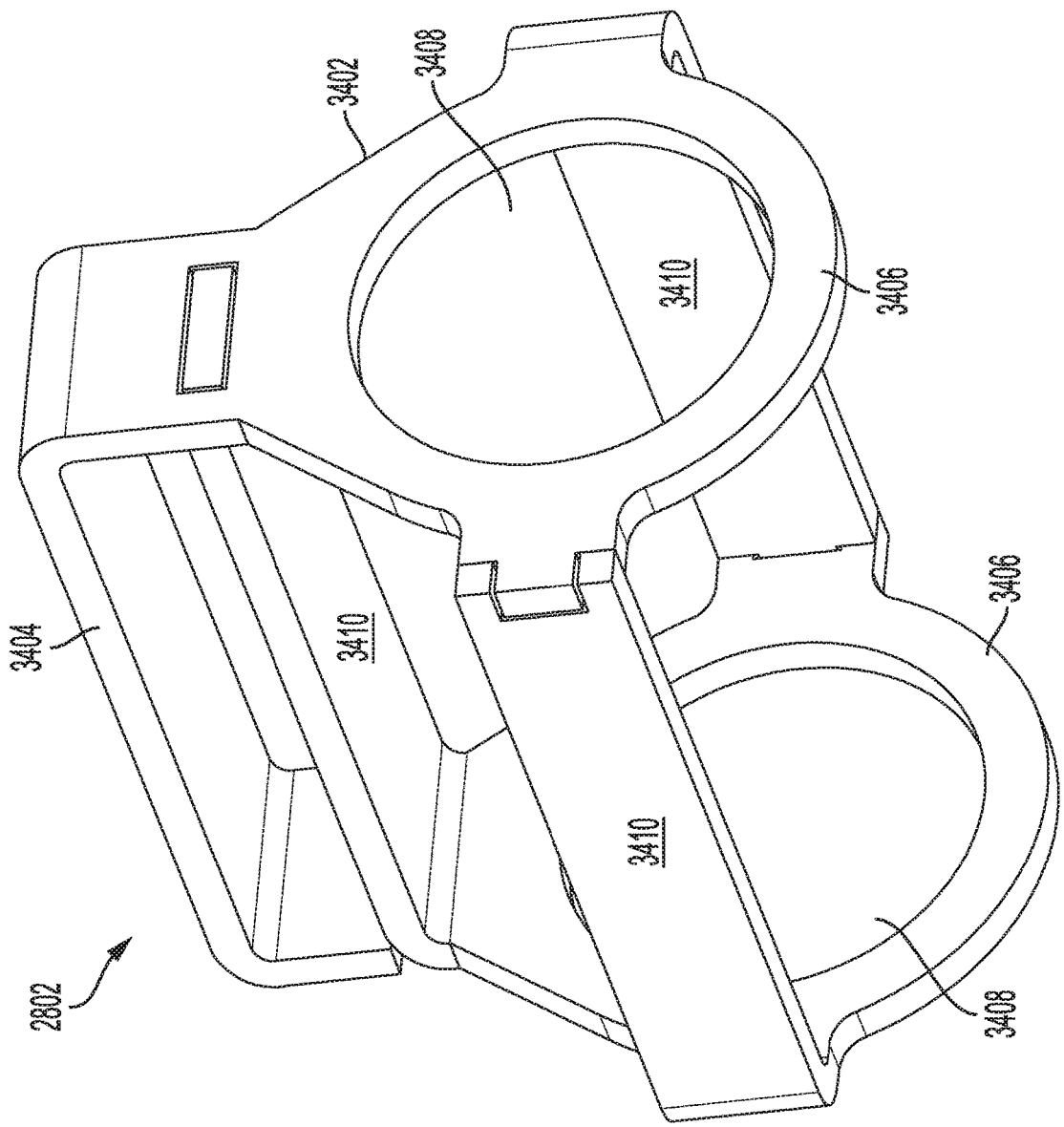
Figure 36:
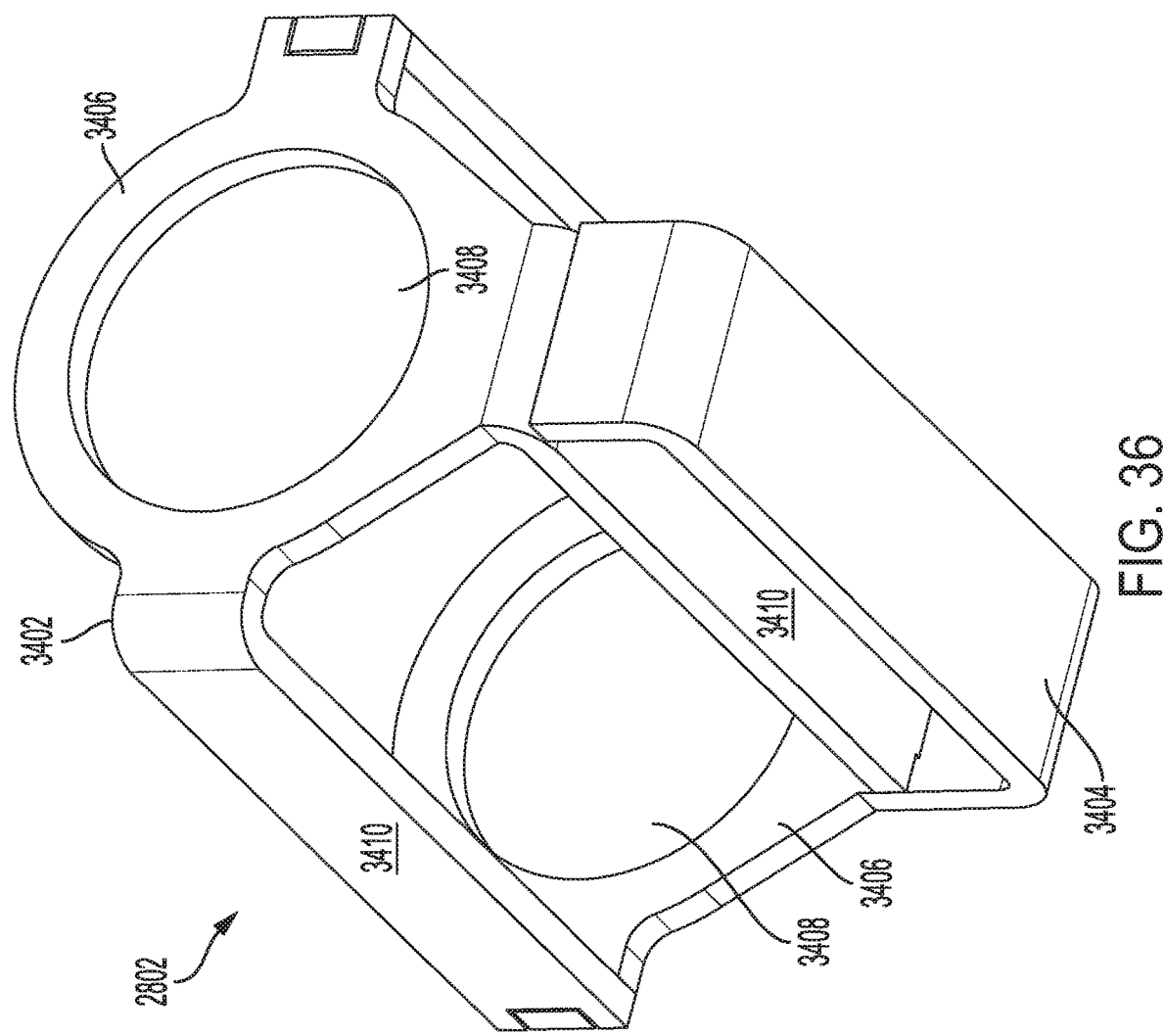

FIGS. 34-36 depict bracket 2802 in isolation. Bracket 2802 is preferably formed from steel. Bracket 2802 generally comprises bracket body 3402 and receiving structure 3404. In the depicted embodiment, receiving structure 3404 is rectangular in shape, having a length and a width to accommodate E-track hook such as a first hook assembly 106 or a second hook assembly 108 placed therein as will be described later. However, it should be obvious that the shape and/or size of receiving structure can be modified to be round, square, etc., to accommodate other shaped mating structures.

Further, in the depicted embodiment, there is a receiving structure 3404 only on a first side of bracket 2802. However, receiving structure 3404 can be added to any location around the exterior of bracket body 3402. In other embodiments, two or more receiving structures 3404 may be present on bracket 2802, such as on opposing sides (e.g., top and bottom, left and right). In another embodiment, four receiving structures 3404 are present around bracket 2802 which are positioned at a top, bottom, left side, and right side of bracket 2802. Different types of receiving structures 3404 may be coupled to different sides of the same bracket 2802.

Openings 3408 preferably have a diameter the same as or greater than a diameter of tube assembly 104 and/or rod assembly 102 so that bracket 2802 can be positioned along an adjustable shoring beam 100 when tube assembly 104 or rod assembly 102 is placed through openings 3408. In a preferred embodiment, openings 3408 have a same diameter as openings 2912 of connection clamp 2804 as depicted in FIG. 28

Bracket body 3402 generally comprises end members 3406 having openings 3408, with end members 3406 being parallel to each other. Two or more rectangular connecting beams 3410 connect the first end member 3406 to the second end member 3406 to form bracket body 3402. In the depicted embodiment, three connecting beams 3410 are present at a top side, a left side, and a right side of bracket 2802. Receiving structure 3404 is coupled to an exterior surface of one or more of the connecting beams 3410. A spacing between at least to connecting beams 3410 around the periphery of end members 3406 must be large enough so that handle 2910 can be opened and closed as needed.

Preferably, connecting beams 3410 have a same length as that of receiving structure 3404. However, it should be apparent that connecting beams 3410 may be longer and/or shorter than receiving structure 3404.

Bracket body 3402 is sized so that connection clamp 2804 can be nested within bracket body 3402 with openings 2912 and 3408 in alignment as depicted in FIG. 28. After connection clamp 2804 has been placed/nested within bracket body 3402, it can then be slide over adjustable shoring beam 100 and secured in place by actuating handle 2910. Bracket 2802 can be freely rotated around connection clamp 2804. However, in some embodiments, bracket body 3402 may comprise inward projecting structures and/or connection clamp 2804 may comprise outward projecting structures which prevent rotation of bracket 2802 around connection clamp 2804, fixing their positions relative to each other.

Figure 37:
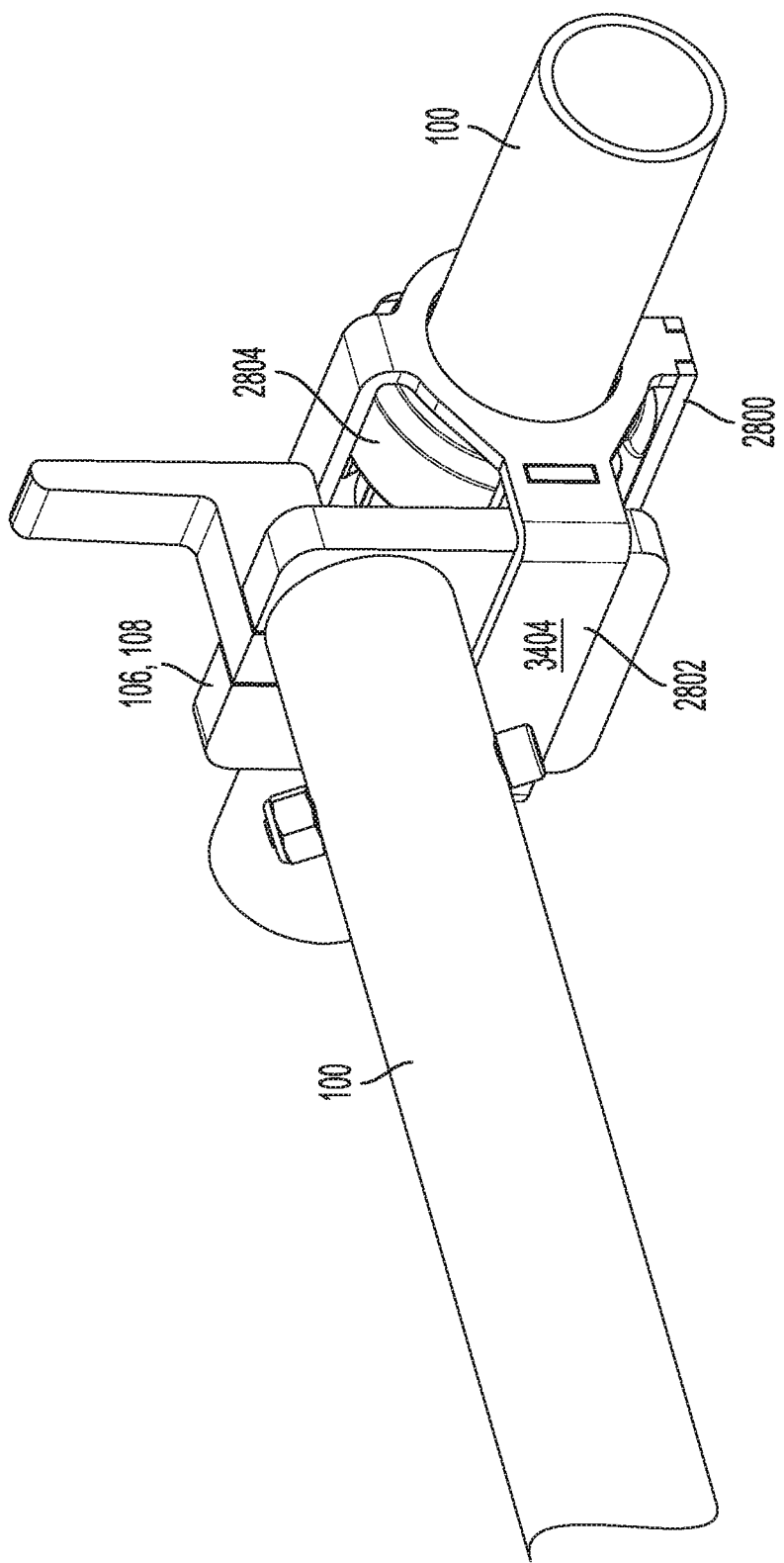
Figure 38:
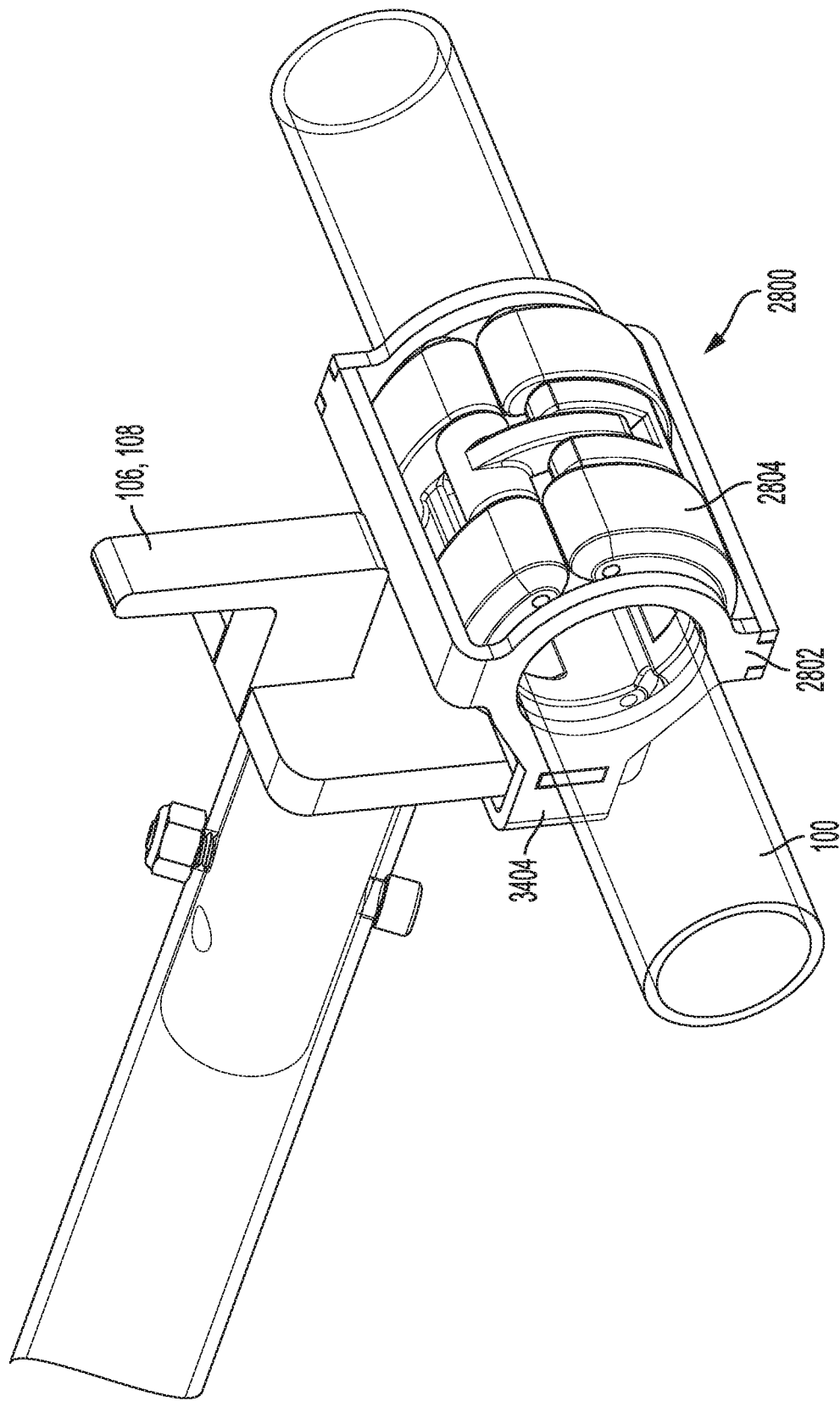

FIGS. 37-39 depict how connection assembly 2800 can be used to connect a first adjustable shoring beam 100 to a second adjustable shoring beam 100. As already described, connection assembly is first adjusted along the length of the first adjustable shoring beam 100 and then is fixed in position as depicted in FIG. 38. A first hook assembly 106 or second hook assembly 108 of a second adjustable shoring beam 100 is then placed in receiving structure 3404 as depicted in FIG. 37 until a bottom of hook section 904 contacts a top surface of connecting beam 3410 as depicted in FIG. 39. The other end of the second adjustable shoring beam 100 can then be placed in another connection assembly 2800 of a third adjustable shoring beam 100 (not shown).

Figure 44:
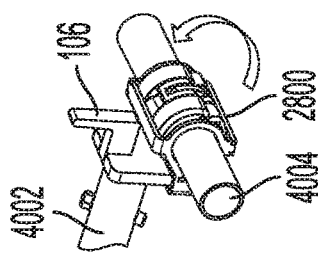
FIGS. 40-44 depict the steps utilized to couple a first adjustable shoring beam to a second adjustable shoring beam.
Figure 43:
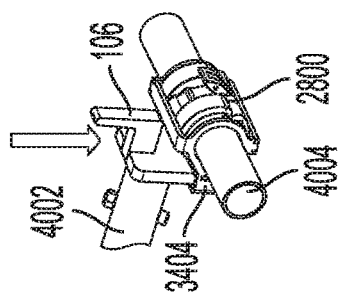
Figure 42:
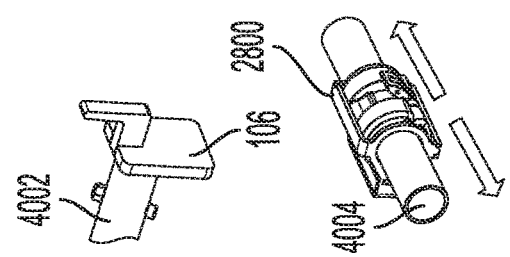
Figure 41:
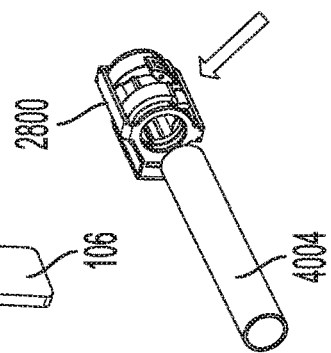
Figure 40:
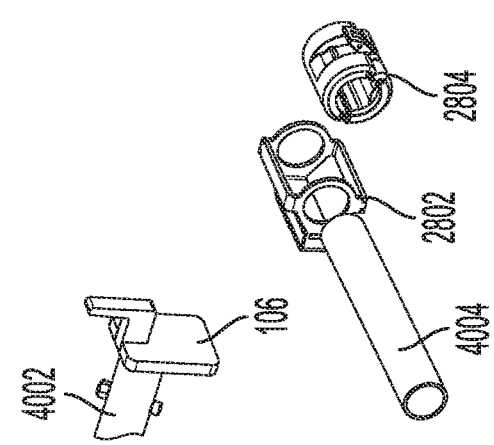

FIGS. 40-44 depict the steps utilized to couple a first adjustable shoring beam 4002 to a second adjustable shoring beam 4004. Handle 2910 of connection clamp 2804 is opened so that connection clamp 2804 can be slid along adjustable shoring beam 4004 as depicted in FIG. 30. Connection clamp 2804 is then inserted into bracket 2802 as depicted in FIG. 41 to form connection assembly 2800. Connection assembly 2800 is positioned over second adjustable shoring beam 4004 as depicted in FIG. 42. First hook assembly 106 of first adjustable shoring beam 4002 is then inserted into receiving structure 3404 of connection assembly 2800 as depicted in FIG. 43. Handle 2910 is then locked to secure movement of connection assembly 2800 as depicted in FIG. 44.

Figure 45:
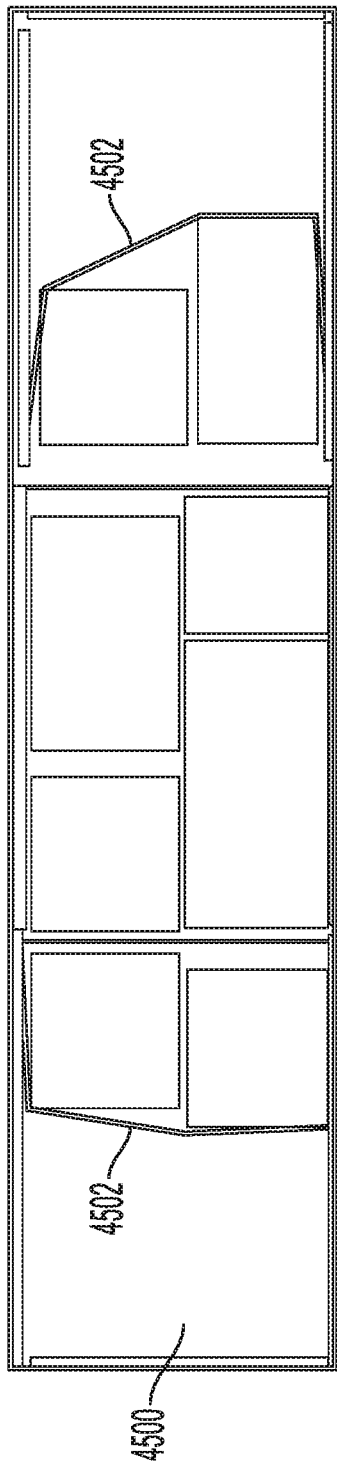
FIG. 45 depicts a related art method used to secure freight and cargo to a movable platform.

FIG. 45 depicts a current method used to secure freight and cargo to a movable platform 4500, such as those disclosed in U.S. Pat. No. 10,279,955, issued May 7, 2019. Straps 4502 are used to secure the ends of the freight on the movable platform 4500. These straps 4502 take a long time to secure as each end must be secured across the movable platform 4500 as depicted in FIG. 45. Further, straps 4502 may not always be available at every cross-dock location which movable platform 4500 traverses.

Figure 46:
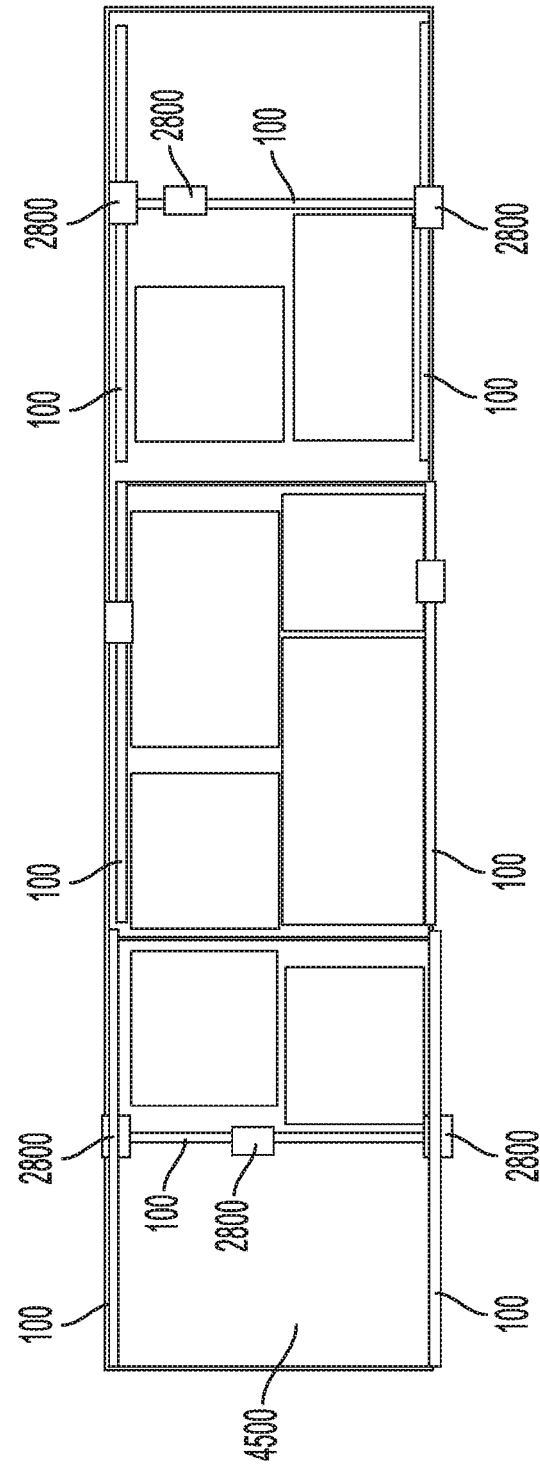
FIG. 46 depicts how a plurality of adjustable shoring beams with connecting structures can be used to secure freight and cargo to a movable platform.

FIG. 46 depicts how adjustable shoring beams 100 having connection structures 2800 installed can alleviate this problem. Adjustable shoring beams 100 are first used on the vertical posts of the movable platform 4500 to secure the freight along the length of movable platform 4500 as depicted in FIG. 10A, for example. Because each adjustable shoring beam 100 already has a connection assembly 2800, one or more adjustable shoring beams 100 can then be coupled to opposing connection assemblies 2800 on opposing adjustable shoring beams 100 as depicted in FIG. 45. Connection assembly 2800 also allows an adjustable shoring beam 100 to be installed horizontally and/or vertically between to other adjustable shoring beams 100.

The design of the adjustable shoring beams 100 discussed herein are designed so that gravity causes the perpendicular connection side of bracket 2802 to naturally fall and rotate downward, maintaining a low profile. The coupling between connection assembly 2800 and adjustable shoring beam 100 is able to maintain a positive connection during transit and exceeds trucking securement standards. Further, because the length of adjustable shoring beam 100 can be quickly adjusted and added to vertical posts or used to bride other adjustable shoring beams 100, there is time saving compared to using straps 4502. The handle 2910 of connection bracket 2804 can also easily be manipulated by a user's thumb, even with gloves on.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. An adjustable shoring beam comprising:
a rod assembly;
a tube assembly,
wherein the rod assembly is slidably received within the tube assembly;
a first hook assembly coupled to a first end of the rod assembly;
a second hook assembly coupled to a first end of the tube assembly;
a bracket slidable along an outside of the adjustable shoring beam;
a connecting clamp nested inside the bracket,
wherein the connecting clamp is also slidable along the outside of the adjustable shoring beam when the connecting clamp is in an open position,
wherein the connecting clamp prevents movement of the bracket along the outside of the adjustable shoring beam when the connecting clamp is in a closed position, and
wherein the bracket is rotatable around the connecting clamp when the connecting clamp is in the closed position.

2. The adjustable shoring beam according to claim 1, wherein the bracket comprises:
a receiving structure for receiving a hook assembly from a second adjustable shoring beam.

3. The adjustable shoring beam according to claim 2, wherein the receiving structure is rectangular in shape.

4. The adjustable shoring beam according to claim 2, further comprising:
a second receiving structure coupled to the bracket.

5. The adjustable shoring beam according to claim 4, wherein the receiving structure is orthogonal to the second receiving structure.

6. The adjustable shoring beam according to claim 4, wherein the receiving structure is parallel to the second receiving structure.

7. The adjustable shoring beam according to claim 4, further comprising:
a third receiving structure coupled to the bracket.

8. The adjustable shoring beam according to claim 4, wherein a shape of the receiving structure is different than a shape of the second receiving structure.

9. The adjustable shoring beam according to claim 1, wherein the bracket comprises a central opening having a diameter greater than or equal to a diameter of the tube assembly.

10. The adjustable shoring beam according to claim 1, further comprising:
a second bracket slidable along the length of the adjustable shoring beam.

11. The adjustable shoring beam according to claim 1, wherein the bracket comprises:
a first end member having a first opening;
a second end member having a second opening; and
at least one connecting beam coupling the first end member to the second end member.

12. The adjustable shoring beam according to claim 11, wherein the first end member and the second end member are parallel.

13. The adjustable shoring beam according to claim 12, wherein the connecting beam is perpendicular to the first end member and the second end member.

14. The adjustable shoring beam according to claim 1, wherein a centerline of the first hook assembly is offset from a centerline of the rod assembly, and
wherein a centerline of the second hook assembly is offset from a centerline of the tube assembly.

* * * * *